(12) United States Patent
Yano et al.

(10) Patent No.: US 12,455,210 B2
(45) Date of Patent: Oct. 28, 2025

(54) WORKING-STATE CABLE PROTECTION MONITORING SYSTEM, WORKING-STATE CABLE PROTECTION MONITORING METHOD, AND STORAGE MEDIUM HAVING STORED THEREIN WORKING-STATE CABLE PROTECTION MONITORING PROGRAM

(71) Applicant: NEC Corporation, Tokyo (JP)

(72) Inventors: Yutaka Yano, Tokyo (JP); Hiroshi Kawakami, Tokyo (JP); Makoto Saitoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 400 days.

(21) Appl. No.: 18/010,329

(22) PCT Filed: Jun. 16, 2021

(86) PCT No.: PCT/JP2021/022775
§ 371 (c)(1),
(2) Date: Dec. 14, 2022

(87) PCT Pub. No.: WO2021/256478
PCT Pub. Date: Dec. 23, 2021

(65) Prior Publication Data
US 2023/0341291 A1    Oct. 26, 2023

(30) Foreign Application Priority Data

Jun. 17, 2020    (JP) ................. 2020-104718

(51) Int. Cl.
*G01M 11/00*    (2006.01)
*G01H 9/00*    (2006.01)
(52) U.S. Cl.
CPC ........ *G01M 11/3109* (2013.01); *G01H 9/004* (2013.01)

(58) Field of Classification Search
CPC .......................... G01M 11/3109; G01H 9/004
See application file for complete search history.

(56) References Cited

U.S. PATENT DOCUMENTS

| 10,466,172 B2 | 11/2019 | Yaman et al. |
| 11,060,950 B1 * | 7/2021 | Xia ..................... H04B 10/032 |

(Continued)

FOREIGN PATENT DOCUMENTS

| GB | 2126820 A | 3/1984 |
| JP | S59-148835 A | 8/1984 |

(Continued)

OTHER PUBLICATIONS

International Search Report for PCT Application No. PCT/JP2021/022775, mailed on Sep. 7, 2021.

(Continued)

*Primary Examiner* — Stephanie E Bloss
*Assistant Examiner* — Diana Hancock
(74) *Attorney, Agent, or Firm* — Sughrue Mion, PLLC.

(57) ABSTRACT

To suppress expansion of damage to a working-state cable due to work being continued without detecting breakage of the working-state cable when the breakage occurs, the working-state cable protection monitoring system is provided with: a working means that moves or installs a wire cable-shaped construction material including an optical fiber having at least one core; an interrogator that acquires environment information about each position of the construction material, sensed by the optical fiber; and an abnormal event detection means that, when the environment information acquired at each position of the construction material satisfies an abnormal pattern, detects an abnormal event at the position, where in the working means stops (Continued)

movement and installment of the wire cable-shaped construction material when the abnormal event has been detected.

12 Claims, 16 Drawing Sheets

(56) References Cited

U.S. PATENT DOCUMENTS

| | | | |
|---|---|---|---|
| 2014/0355383 A1 | 12/2014 | McEwen-King et al. | |
| 2015/0128706 A1* | 5/2015 | Godfrey | G01H 9/004 73/574 |
| 2020/0249106 A1* | 8/2020 | Godfrey | H02G 9/02 |
| 2022/0021983 A1* | 1/2022 | Doll | G01L 1/246 |

FOREIGN PATENT DOCUMENTS

| | | | |
|---|---|---|---|
| JP | H06-102140 A | | 4/1994 |
| JP | 6102140 B | * | 12/1994 |
| JP | 3127934 B2 | | 1/2001 |
| JP | 2001-515334 A | | 9/2001 |
| JP | 2006258707 A | * | 9/2006 |
| JP | 4592279 82 | | 12/2010 |
| JP | 2019180109 A | * | 10/2019 |
| JP | 2020-508464 A | | 3/2020 |
| WO | 2019/022084 A1 | | 1/2019 |

OTHER PUBLICATIONS

Editorial supervisor Noboru Ohyama and Moriji Kuwabara, "Optical Submarine Cable Communication", published by KDD Engineering and Consulting, published in 1991, pp. 268-299.

R. Posey Jr. G.A. Johnson and S.T. Vohra, "Strain sensing based on coherent Rayleigh scattering in an optical fibre", Electronics Letters, Sep. 28, 2000, vol. 36 No. 20.

G. Marra et al., "Ultrastable laser interferometry for earthquake detection with terrestrial and submarine cables", Science Aug. 3, 2018, vol. 361, Issue 6401, pp. 486-490.

* cited by examiner

WORKING-STATE CABLE PROTECTION MONITORING SYSTEM, WORKING-STATE CABLE PROTECTION MONITORING METHOD, AND STORAGE MEDIUM HAVING STORED THEREIN WORKING-STATE CABLE PROTECTION MONITORING PROGRAM

This application is a National Stage Entry of PCT/JP2021/022775 filed on Jun. 16, 2021, which claims priority from Japanese Patent Application 2020-104718 filed on Jun. 17, 2020, the contents of all of which are incorporated herein by reference, in their entirety.

TECHNICAL FIELD

The present disclosure relates to a protection monitoring system and the like during work of a construction-material cable.

BACKGROUND ART

[Working-State Construction-Material Cable]

Installation work of an infrastructure cable for communication, power transmission, and the like is referred to as cable laying construction. In general, an elongated cable is hauled to a site while being wound, and is linearly laid by using any laying machine.

A cable stored while being wound in a coil state is drawn and gradually moved. During movement work for rewinding the cable at a movement destination, a part of an elongated cable is in contact with a machine such as a roller-attached trough and a hauling machine.

[Laying Construction of Submarine Cable]

As typical work for a cable, laying construction of a submarine cable is described as an example.

As described in detail in Chapter 9.3 "Cable Laying Construction" of NPL 1, a submarine cable is laid by using a construction ship referred to as a cable ship (CS). A submarine cable connected into a series length with respect to each unit of certain construction is loaded in a tank of a CS while being wound. In a laying site, a submarine cable is in a state of hanging toward the sea bottom from the CS, and in synchronization with forward movement of the CS, the cable is paid out from inside a ship. The cable having moved to outside of the ship sinks toward the sea bottom.

While a submarine cable is moving and unstable as in a period from exit of the submarine cable from a CS tank to landing on the sea bottom, a damage accident is likely to occur. Roughly, there are two risk factors. A first risk factor is that, when a machine for moving and installing a cable makes contact with the cable, the machine accidentally causes damage to the cable. A second risk factor is damage due to contact between an obstacle existing under the sea and a cable while the cable traverses under the sea until the cable lands on the sea bottom from a laying ship on the sea.

A machine used for laying a submarine cable includes a cable engine, a plough burying machine (plough), a remotely operated vehicle (ROV), and the like. In particular, when a plough burying machine or an ROV on the sea bottom is remotely operated from the CS, it is difficult to recognize a peripheral status, and therefore a cable may be damaged during construction.

An inclination angle of a cable being laid with respect to a horizon is shallow to an extent of 12 degrees, and therefore, commonly, a bottoming spot is away from the ship approximately by a distance of four to five times the water depth. For example, in a location of a water depth of 3000 m, a cable bottoming spot is away from the ship approximately by 14 km. Cable damage may occur when, in this distance, the cable makes contact with fishing equipment traversing under the sea, a wire rope of a floating fish bed, or the like.

A communication submarine cable includes a power supply line for operating a device under the sea. When a submarine cable is damaged, damage referred to as "an earth fault" in which an insulating coating is broken and the power supply line is brought into contact with seawater on the outside frequently occurs. When such damage occurs, power cannot be supplied beyond an earth fault spot, and therefore a device under the sea does not operate.

Supply voltage to a communication submarine cable is frequently a high voltage of several kV. In order to prevent an electric shock accident, during work of laying construction in which a submarine cable is hanged from a CS, basically, power is not supplied to the submarine cable. In general, a step of conducting a power supply test after evacuating workers on a working deck and confirming insulation of a cable is performed periodically.

[Regarding Laying Construction Machine]

In general, it is desirable that, in a shallow sea area, a submarine cable permanently installed on the sea bottom is buried in a dug channel of approximately one meter. The reason is that, in a shallow sea, human activities such as fishing tend to reach the sea bottom, and therefore, burying is performed to make interference with the submarine cable-less likely to occur. As the burying construction method, laying simultaneous with burying by a plough burying machine or post-burying by an ROV is generally used.

In laying simultaneous with burying by a plough burying machine, as illustrated with a dotted line in FIG. 2, a plough burying machine is brought down to the sea bottom from a CS by using a wire and the CS pulls the plough burying machine via the wire. The submarine cable is passed through the plough burying machine and is placed in a channel dug by the plough burying machine, and then an upper portion of the channel is covered again with earth and sand. Burying is performed simultaneously with laying, and therefore the above-described construction method is referred to as a laying simultaneous with burying construction method.

Post-burying by an ROV is a construction method for a submarine cable being already laid on the sea bottom, and therefore, is referred to as a post-burying construction method. A remotely operated unmanned submarine instrument referred to as an ROV is brought down from a construction ship to the sea bottom, a channel is dug into the sea bottom by using a jet water stream, a submarine cable is dropped into the channel, and the channel is covered with earth and sand.

[Information Relating to Cable Laying Construction]

Cable route information is generally represented by a route position list (RPL). In the RPL, a cable route, which is actually a curved route, is approximately represented by using many spots and a straight line connecting the spots. Each piece of spot information is described together with at least a unique spot number, geographical coordinates (latitude/longitude) representing a location, and attribute information of a water depth. An installation spot of a component or a device other than a cable is also described as spot information in the RPL together with a unique discrimination number. Regarding the cable, information about a type of an exterior is described.

Fishing activity information is provided, from a fishery organization understanding interference avoidance between a submarine cable and fishing, as information about an area and a period in which fishing having a probability of interference with a cable when an operation location is mistaken is performed.

Vicinity work information is provided as information about an area and a period in which offshore engineering work such as dredging and boring, laying and recovery of a submarine cable, and installation of a fish bed, acoustic sea bottom measurement, and an oceanographic survey such as a geological survey are performed.

Water channel notification/marine navigation warning information may include the above-described work information but, in addition thereto, is provided as information such as information about an area and a period of military training and the like and information of a floating object.

[Optical Fiber Sensing Technique]

In optical fiber sensing, for example, coherent light is caused to enter a sensing optical fiber, return light from portions of the sensing optical fiber is detected and analyzed, and disturbance (dynamic distortion) acting on the sensing optical fiber is acquired as environment information. Such disturbance is typically a vibration of the sensing optical fiber being caused by an acoustic wave or the like travelling to a portion of the sensing optical fiber. When such information representing presence of a vibration in at least a portion of the sensing optical fiber is acquired as environment information, optical fiber sensing is referred to as distributed acoustic sensing (DAS).

A technique for DAS is disclosed, for example, in PTL 1, PTL 2, and NPL 2. DAS is one type of a sensing method based on an OTDR method. Herein, OTDR is an abbreviation for optical time-domain reflectometry.

FIG. 1 is a description diagram of an operation of a general optical fiber sensing system of an OTDR method. An upper portion of the diagram schematically illustrates a main configuration of a sensing system, and a lower portion thereof schematically illustrates a power level according to a distance of each of probe light and backscattering light of the probe light and how probe light and backscattering light of the probe light move with time.

As illustrated in FIG. 1, an optical fiber sensing system of an OTDR method includes an interrogator 100 and an optical fiber 200. The interrogator 100 transmits probe light 900 to the optical fiber 200 being a sensing optical fiber. The probe light 900 moves through the optical fiber 200 rightward and, in a movement process, backscattering light such as backscattering light 801 and 802 is generated in locations of the optical fiber 200. The backscattering light is typically Rayleigh backscattering light. The backscattering light moves leftward through the optical fiber 200 toward the interrogator 100 and enters the interrogator 100. Backscattering light generated in each location of the optical fiber 200 is subjected to an influence of an environment of the location. The environment is, for example, a temperature of the location and presence of a vibration such as a sound.

The interrogator 100 detects a degree of an influence, in each location of the optical fiber 200, being caused on backscattering light being return light.

The interrogator 100 derives, from information detected from the return light, environment information relating to an environment in each location of the optical fiber 200. The environment information is, for example, information representing a vibration status of the optical fiber 200.

CITATION LIST

Patent Literature

[PTL 1] GB Patent No. 2126820 specification
[PTL 2] Japanese Unexamined Patent Application Publication No. S59-148835
[PTL 3] Japanese Patent No. 3127934
[PTL 4] U.S. patent Ser. No. 10/466,172 specification
[PTL 5] Japanese Patent No. 4592279

Non Patent Literature

[NPL 1] Editorial supervisor Noboru Ohyama and Moriji Kuwabara, "Optical Submarine Cable Communication", published by KDD Engineering and Consulting, published in 1991
[NPL 2] R. Posey Jr, G. A. Johnson and S. T. Vohra, "Strain sensing based on coherent Rayleigh scattering in an optical fibre", ELECTRONICS LETTERS, 28 Sep. 2000, Vol. 36 No. 20
[NPL 3] G. Marra et al., "Ultrastable laser interferometry for earthquake detection with terrestrial and submarine cables", Science 3 Aug. 2018: Vol. 361, Issue 6401, pp. 486-490

SUMMARY OF INVENTION

Technical Problem

There is a problem that a wire cable having tensile force is dangerous when bounding or coming-off occurs, and has difficulty in being exhaustively monitored due to a reason that a machine that moves and installs the cable is remotely located and scattered, and the like.

For example, as in PTL 3, a technique for detecting damage occurrence of an installed cable by using an optical fiber has been known, but there is no technique for monitoring, by using an optical fiber, occurrence of damage to a cable during laying construction or movement.

There is a problem that, when construction is advanced without perceiving damage, a loss is spread. A case where a cable is damaged endlessly is obvious, however, even when there is damage merely in one location, regression increases and a loss is spread when it is necessary to wind, for repair, a cable section constructed after damage occurrence.

Further, there is a problem that damage of a cable is perceived only when an apparent damage phenomenon such as an insulation failure appears. For example, even when an insulating coating is scraped and becomes locally thin, such damage cannot be detected. There is a case where such a portion being structurally weak becomes apparent as a failure when the cable is pulled later and the like.

Therefore, in a case of damage which does not become apparent as a failure, stopping work, confirming a state of the portion, and taking an appropriate countermeasure such as repair cannot be performed. There is a problem that, when construction is advanced without perceiving latent damage, large regression occurs when damage is actualized, and as a result, a loss is spread.

A sensing technique for detecting a vibration or a sound by using an optical fiber has been known, but there is a problem that, during laying construction or movement, a cable is subjected to severe machine sounds and vibrations and an abnormal vibration causing damage to the cable is mixed with the background noise, and therefore it is difficult to accurately detect occurrence of an abnormal event.

In a communication cable, an amplification repeater that operates only when power is supplied via a cable is inserted. There is a problem that, when a working-state cable is monitored, an anterior portion beyond such an amplification repeater cannot be monitored.

As described above, there is a possibility that, even when, during work for handling a cable as a construction material, an abnormal event having a possibility of damaging a cable occurs, the abnormal event cannot be detected in real time and work is advanced, and as a result, a loss is spread.

Solution to Problem

A working-state cable protection monitoring system according to the present invention includes:
a working means for moving or installing a wire cable-shaped construction material including an optical fiber having at least one core;
an interrogator that acquires environment information in each location of the construction material being sensed by the optical fiber; and
an abnormal event detection means for detecting, when the environment information acquired in the location satisfies an abnormal pattern, an abnormal event in the location, wherein
the working means stops movement and installation of the wire cable-shaped construction material when the abnormal event is detected.

A working-state cable protection monitoring method according to the present invention includes:
acquiring, by an optical fiber having at least one core being included in a wire cable-shaped construction material being moved or installed, environment information in each location of the construction material;
detecting, when the environment information acquired in the location satisfies an abnormal pattern, an abnormal event in the location; and
stopping, when the abnormal event is detected, movement and installation of the wire cable-shaped construction material.

A storage medium according to the present invention stores a working-state cable protection monitoring program causing an information processing device to execute:
processing of acquiring, by an optical fiber having at least one core being included in a wire cable-shaped construction material being moved or installed, environment information in each location of the construction material;
processing of detecting, when the environment information acquired in the location satisfies an abnormal pattern, an abnormal event in the location; and
processing of stopping, when the abnormal event is detected, movement and installation of the wire cable-shaped construction material.

Advantageous Effects of Invention

According to the present invention, during work for handling a cable as a construction material, when an abnormal event having a possibility of causing a scratch in a construction-material cable occurs, being unable to detect the abnormal event in real time and spreading of loss due to work being advanced are able to be reduced.

A submarine cable itself functions as a sensor and enables detailed and real-time monitoring which has been impossible so far, and thereby a cost reduction effect such as reduction of the number of security guards or warning ships regulating entering into a work range is exhibited.

EXAMPLE EMBODIMENT

Hereinafter, example embodiments according to the present disclosure are described with reference to the accompanying drawings. Note that, the following description and drawings are appropriately omitted and simplified in order to clarify description. In the following drawings, the same element is assigned with the same reference sign and overlapping description is omitted, as necessary.

First Example Embodiment

First, an operation outline of a cable protection monitoring system 1 according to a first example embodiment is described.

Figure 1:
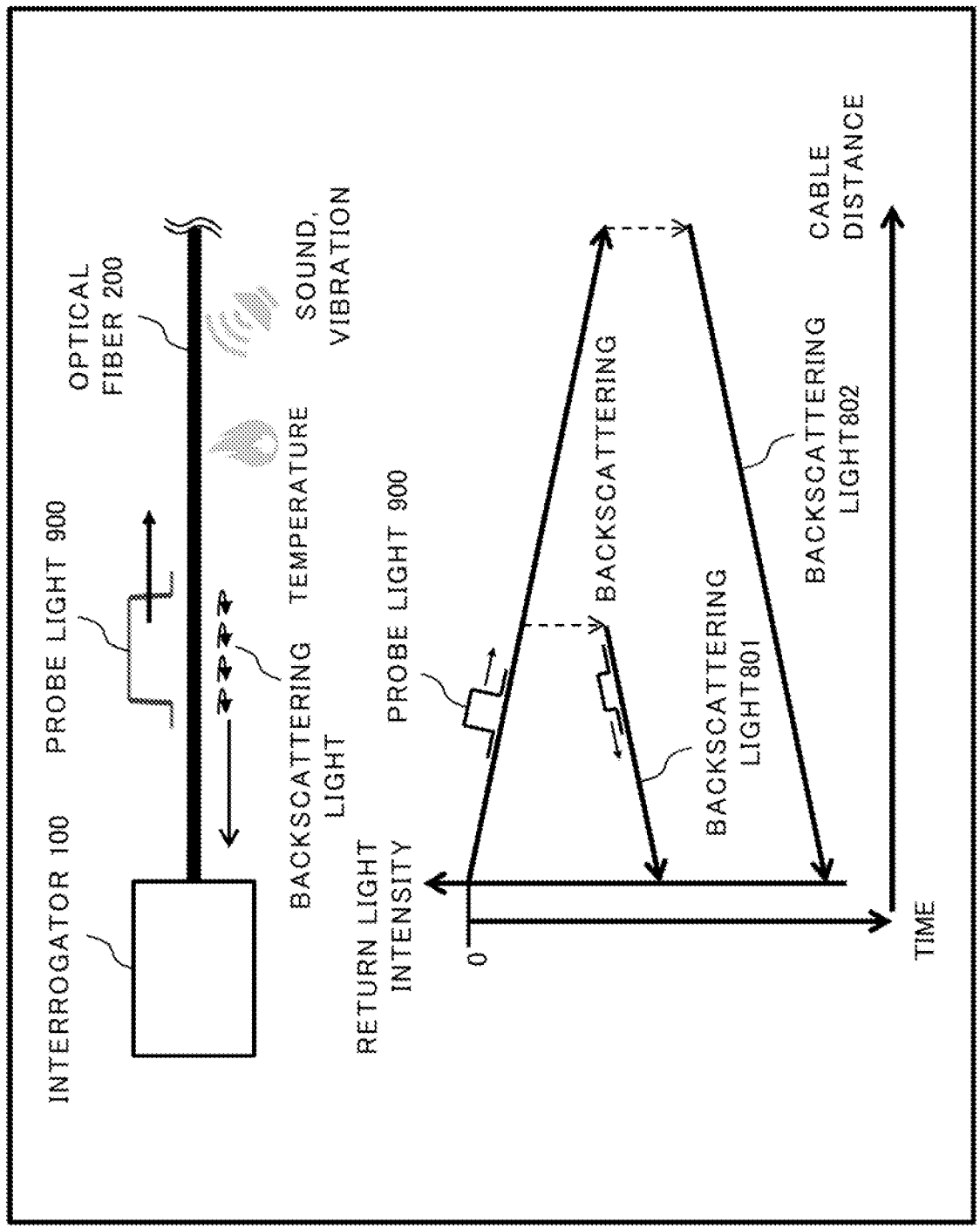
FIG. 1 is an operation description diagram of a general optical fiber sensing system of an OTDR method.
Figure 2:
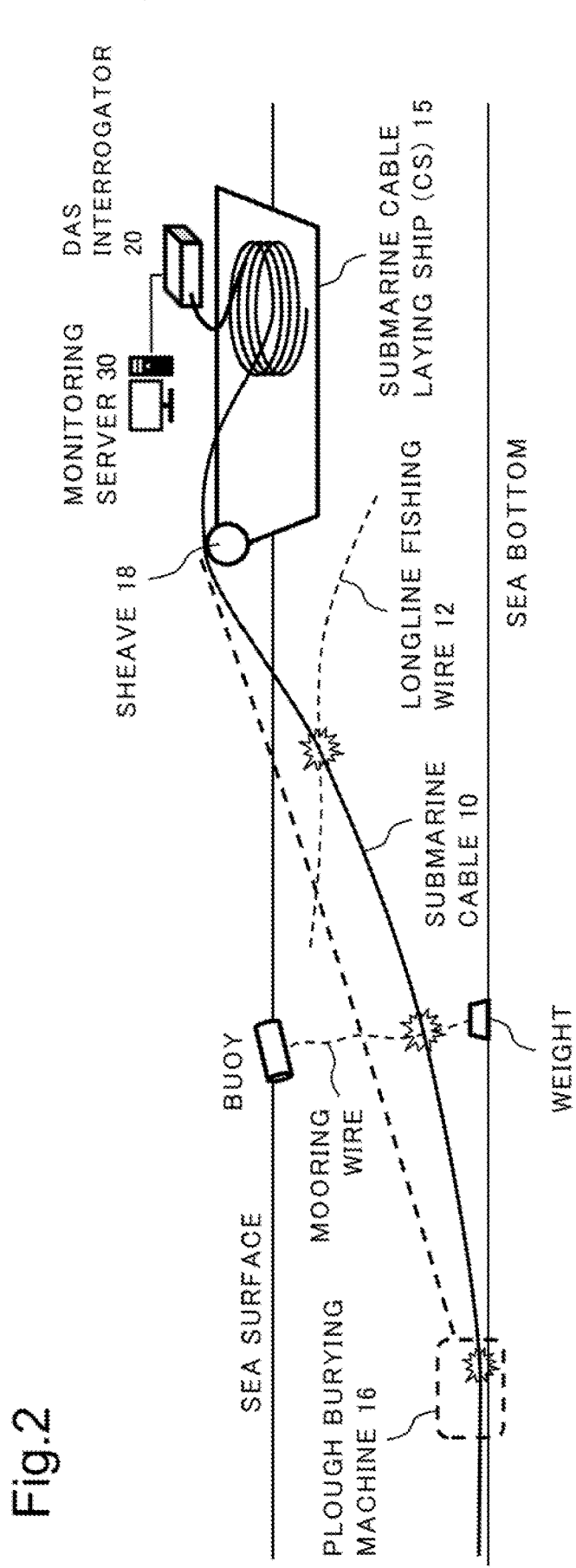
FIG. 2 is a schematic diagram of submarine cable laying construction according to a first example embodiment.

With reference to FIG. 2, a configuration example of the cable protection monitoring system 1 during laying according to the first example embodiment is described by using an example of a submarine cable.

A submarine cable 10 (hereinafter, also referred to as a construction-material cable) is gradually drawn from an inboard tank of a CS 15, enters water, forms a catenary, and lands on the sea bottom, typically separate approximately by a factor of four to five of a water depth. In a case of a laying simultaneous with burying construction method, a large machine referred to as a plough burying machine 16 is present in a bottoming portion, and a channel is dug in the sea bottom and a construction-material cable is dropped and buried in the channel.

Figure 3:
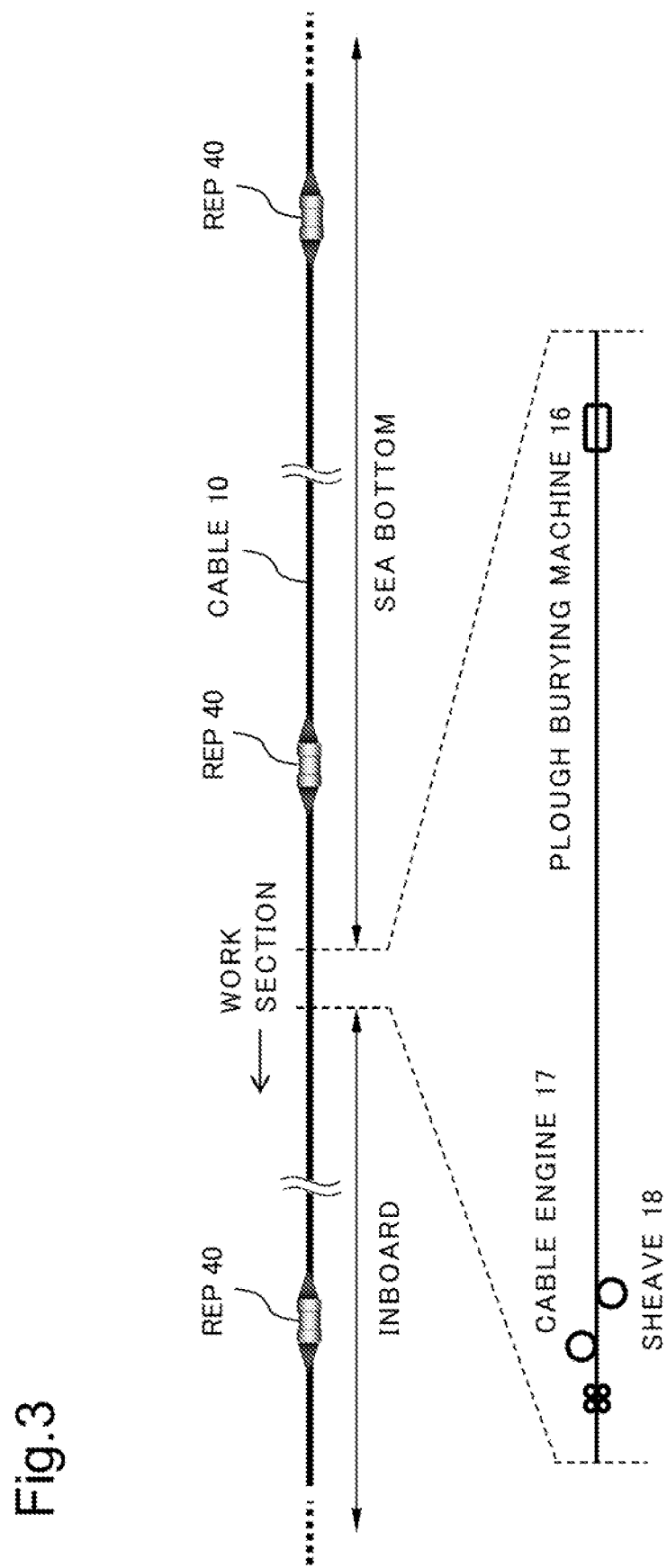
FIG. 3 is a description diagram of a cable work location of the submarine cable laying construction according to the first example embodiment.

FIG. 3 is a diagram illustrating a movement of a working-state section by comprehensively viewing the entire construction-material cable. A construction-material cable (also referred to as a construction material) includes an optical fiber having at least one core and has a wire cable shape.

Among construction-material cables, a left-side cable in FIG. 3 is wound in an inboard tank of the CS 16. The wound cable is drawn and forms a section during laying work and is laid on the sea bottom as in a right-side cable in FIG. 3. A cable present in the inboard tank is supplied to a cable engine 17, is paid out from the cable engine 17 at an appropriate speed, and is dropped into the sea from a sheave 18 present in a bow or a stern of the ship. Then, the cable bottoms on a location separate by a factor of four to five of a water depth. In a laying simultaneous with burying method, the plough burying machine 16 is present in a bottoming location and the cable is buried. The cable protection monitoring system 1 includes a working means such as the cable engine 17, the sheave 18, and the plough burying machine 16 described above. The working means indicates a means that moves or installs a wire cable-shaped construction material including an optical fiber having at least one core.

When viewed from a construction-material cable side, in FIG. 3, a work section is viewed as moving from right to left. A submarine cable 10 is subjected to marking in an appropriate interval in such a way that a distance from a certain start point can be recognized. A submarine device such as a repeater is also connected to the submarine cable 10 at a predetermined interval. By confirming visually or by a monitoring camera marks on the submarine cable 10 pass through the sheave 18 and the plough burying machine 16, a current location of a work section on the construction-material cable is recognized.

The matter having described so far is commonly-performed laying construction work.

In the laying work described above, the cable protection monitoring system 1 according to the present example embodiment is described by using FIG. 2. The cable protection monitoring system 1 incudes at least a submarine cable 10 being a monitoring target, a DAS interrogator 20 that senses, by using an optical fiber 11 (not illustrated) included in the submarine cable 10, environment information (typically, a sound or a vibration applied to a construction-material cable) of a submarine cable periphery, and a monitoring server 30.

Herein, the DAS interrogator 20 senses environment information (typically, a sound or a vibration) of a periphery of a submarine cable 10 including a work section of the submarine cable 10 during laying, automatically classifies an abnormal event, and outputs information to the monitoring server 30. The information includes a type (automatic classification result) of an abnormal event, an occurrence time, and an occurrence location on the submarine cable 10. DAS is one type of an OTDR method and therefore, a location on a submarine cable 10 where an event occurs can be recognized with high accuracy. Thereby, an occurrence location of an abnormal event can be recognized.

Figure 4:
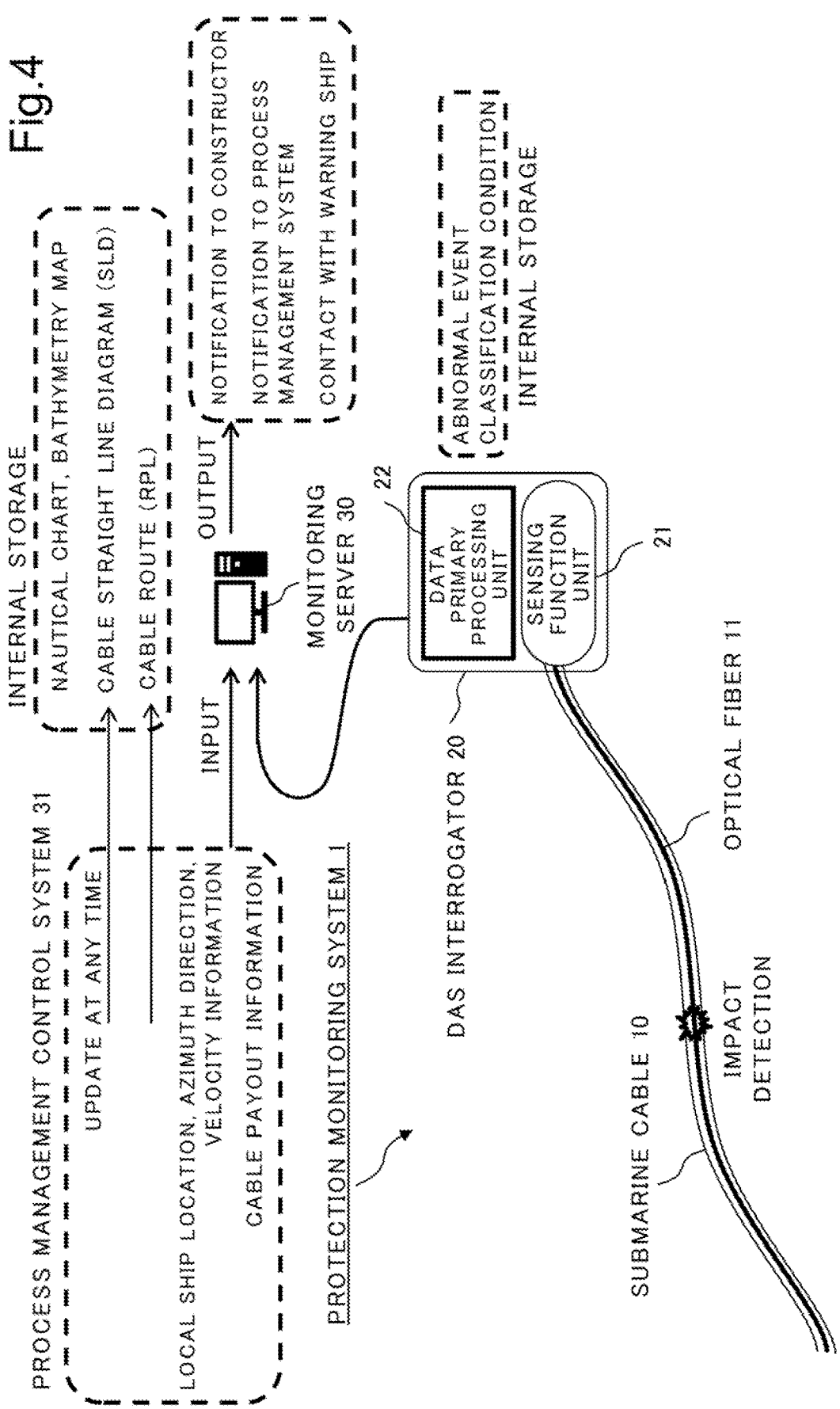
FIG. 4 is a description diagram of information processing according to the first example embodiment.

An outline of a DAS technique has been described in Background Art. According to the present example embodiment, a DAS sensing system included in the cable protection monitoring system 1 includes, as illustrated in FIG. 4, an optical fiber 11 and a DAS interrogator 20. The DAS interrogator 20 includes a sensing function unit 21 and a data primary processing unit 22. The optical fiber 11 is accommodated inside of the submarine cable 10 applied with a coating for mechanical reinforcement. It can be said that the optical fiber 11 is laid along a working-state submarine cable 10 being a monitoring target. The optical fiber 11 plays a role of a sensor function and a transmission medium of a sensing signal.

The DAS interrogator 20 sequentially receives backscattering light generated at spots of an elongated optical fiber 11 and outputs pieces of sensing signal output including environment information in each spot. Thereby, the DAS interrogator 20 acquires environment information in each location of a construction-material cable (construction material) sensed by the optical fiber 11. The environment information may be, for example, a sound, a vibration, a temperature, or a temporal change of these items.

These pieces of sensing signal output are transferred to the monitoring server 30, but with regard to data such as a sound or a vibration specifically having a very large data amount, the data primary processing unit 22 (abnormal event detection means) performs abnormal event classification and narrows down the data amount, and thereafter transfers data to the monitoring server 30.

A construction-state construction-material cable is subjected to various sounds and vibrations but a major portion of these sounds and vibrations is not problematic. The data primary processing unit 22 classifies and detects, from among the sounds and the vibrations, a sound or a vibration having a pattern indicating abnormality and notifies the monitoring server 30 of the detected sound or vibration. The data primary processing unit 22 classifies, from among sounds or vibrations, for example, a sound or a vibration in which an amplitude or a frequency satisfies a predetermined condition as a sound or a vibration having a pattern indicating abnormality. The monitoring server 30 immediately stops, when an abnormal event of concern is input, moving or installing a construction-material cable performed by the above-described working means. The construction-material cable is wound into the CS and thereby, a portion of concern is confirmed visually or the like. Reinforcement or repair is performed as necessary, and laying construction is resumed. Thereby, a regression loss due to delay of detection of accident occurrence can be reduced to a minimum level.

The operation outline of the cable protection monitoring system 1 has been described above. Next, individual details are described.

[Risk of Working-State Cable]

A working-state construction-material cable has a damage risk higher than a construction-material cable being in a storage state or an installation state. As one example, two caution-needed states in the submarine cable 10 are described. A first state is a state from exit from a CS to landing on the sea bottom. A second state is a state of passing through a laying machine or the like.

A first damage risk in a section from exit from a CS to landing on the sea bottom is described by using FIG. 2. A submarine cable 10 in the section is present in water and traverses under the sea. Therefore, the submarine cable 10 in this section has a risk of making contact with an obstacle floating in the sea, for example, longline fishing wire 12, a wire rope 13 for mooring a float, or the like. While the following rarely happens, it is conceivable that a submarine cable 10 collides with a propulsion machine of a local ship or another work ship nearly present or a submarine cable 10 accidentally makes contact with a buoy mooring cable or a submarine structure a location of which should have been previously recognized.

A second damage risk is a risk of a poor operation of a laying machine or the like. A construction heavy machine such as the plough burying machine 16 present on the sea bottom is operated on an unmanned and remote basis, and therefore when an operation is erroneously performed, there is a risk of damaging a submarine cable 10 under construction. In this manner, a submarine cable 10 during movement is exposed to a risk higher than after installation and therefore, real-time monitoring is of great significance.

[Risk of Laid Cable]

A submarine cable 10 placed on the sea bottom after laying work is likely to be damaged due to slippage or the like until the submarine cable 10 and the sea bottom are fitted in each other. Immediately after a submarine cable 10 is laid, the submarine cable 10 is not reflected in a nautical chart or the like and is not recognized by marine vessels, and therefore the submarine cable 10 is likely to be damaged.

When these damage risks occur immediately after laying, laying work is stopped immediately and a submarine cable 10 is rewound and may be subjected to repair or the like. Thereby, the number of days and a cost required for repair can be reduced, compared with repair after laying completion. Even with regard to damage risk occurrence after several days from laying, when damage risk occurrence can be detected at the same time as the occurrence, a plan for a laying ship to return to a damage occurrence spot and perform repair can be easily made, and thereby a movement distance of a ship, the number of repair days, and a cost are expected to be reduced. As such, a submarine cable 10 having been just laid has a high damage risk, compared with a general submarine cable having been already laid, and therefore real-time monitoring is of great significance.

According to the present example embodiment, in this manner, a laid construction-material cable is also monitored as a part of a working-state cable.

[Non-Uniformity of Sensor Characteristics: Difference Such as Cable Type and Correction]

A cable type and a laying construction method of a submarine cable 10 that acquires environment information differs according to a laying location. Therefore, characteristics as a sensor of a submarine cable 10 are different with respect to each location. For example, a degree of attenuation of a specific frequency range in an acquired environment information signal is different. In order to acquire an event classification result with higher reliability in the data primary processing unit 22 to be described later, it is desirable to execute correction processing of eliminating the influence and approaching an original signal.

Herein, a difference in a cable type includes, for example, a difference in a cross-section structure according to power transmission use, communication use, or the like, a difference in a structure of a protection coating (presence/absence of exterior iron wire and a type of the exterior iron wire), and the like. A difference in an installation construction method is, for example, a construction method of merely placing a cable on the sea bottom surface, a construction method of digging a channel in the sea bottom and burying a cable in the channel, and the like.

These differences with respect to each location of a cable are recognizable by referring to a production record of a cable and a construction record (e.g., an RPL), and therefore correction can be substantially uniquely applied to each location of a submarine cable 10. A specific correction method, for example, includes increasing an amplitude of a specific frequency range, based on a filter.

There is also a method of applying the correction not to an acquired data side but to a classification condition side to be described later. When, for example, there is a characteristic in which a high frequency side of environment information is attenuated due to a structure of a cable, acquired data are not corrected but a high frequency side of a classification condition is attenuated according to a cable type in an acquisition location, and thereby pattern discrimination matching is easily achieved. However, correction of the acquired data side has an advantage of increasing versatility of data usage or the like and therefore is preferable.

[Non-Uniformity of Sensor Characteristics: Difference with Respect to Each Site and Calibration]

A factor of a variation of sensor characteristics of spots of a laid submarine cable 10 is not always uniquely determined (estimated) from the above-described construction record or the like. For example, even in a record indicating burying in a uniform depth, actually, in some cases, a burying depth varies with respect to each location or earth and sand for covering is washed away and the cable may be exposed.

For this problem, a method of using a sound propagating to a site in a wide range as a reference and performing calibration is conceivable. As a reference sound, an artificial sound or a naturally generated sound may be used. Same sounds are sensed in spots on a submarine cable 10 and therefore, correction may be made for each spot in such a way that these sounds come close to an identical sound or come close to a value according to a distance from a sound source.

Based on the calibration, whether each spot on a submarine cable 10 is suitable for acquiring target environment information may be recognized. For example, a certain spot is very low in sensitivity and therefore cannot be completely corrected, a certain spot is likely to resonate in a specific frequency range and is difficult to correct, and the like. Such spots having slight difficulty in environment acquisition can be extracted by comparison with anteroposterior moving average trends. Therefore, at a time of event detection classification, these spots having difficulty are eliminated with consciousness of a distribution of observation spots, and data from spots in which substantially average environment information are assumed to be acquired are used, and thereby observation performance can be improved.

[Addition of Geographical Coordinates Information]

Environment information acquired based on the above-described processing can be used for various applications. For such use in various applications, it is necessary to represent an acquisition location based on geographical coordinates. In a stage of data output by the sensing function unit 21, an acquisition location is represented by a location (e.g., a distance from an optical cable end) on an optical cable. A location on a cable and geographical coordinates data in which an optical cable described in a construction record (RPL or the like) are collated, and thereby geographical coordinates corresponding to each location on the cable are determined. A corresponding relation between a location on the cable and geographical coordinates does not change after cable installation and therefore, may be previously calculated and stored in the data primary processing unit 22. At that time, it is desirable to cite water depth (altitude) data from the RPL and include the water depth data in geographical coordinates information.

Then, the data primary processing unit 22 adds, before detecting and analyzing an abnormal event from sensing data, geographical coordinates information corresponding to a location on a cable to individual pieces of data.

[Detection of Event and Classification Function]

Acquired environment information incudes various pieces of information, and it is necessary to find, from among these pieces of information, an event worthy of attention without omission and erroneous detection as much as possible. According to the present example embodiment, an event to be detected includes, for example, a sound generated by strong friction between a construction-material cable and a working means, a sound generated by contact between a construction-material cable and a floating object in the sea, a sound of an event having a possibility of damaging an installed construction-material cable, and the like. Meanwhile, for example, a working means applies a large sound to a construction-material cable even during normal operation, but it is necessary to prevent, as much as possible, erroneously detecting the large sound as an event having a damage risk and stopping work.

Note that, description is made assuming that the countermeasure against non-uniformity of sensor characteristics in spots of a cable and addition of geographical coordinates information as described above have been processed before detection and classification of an event.

The data primary processing unit 22 accurately detects and classifies a sound indicating a damage risk appearing by being mixed with a sound which is not abnormal. Therefore, the data primary processing unit 22 previously includes, for each of known events, a unique feature as a classification condition. A feature used for a classification condition is a feature present in a frequency of an abnormal event signal, a temporal change of a frequency, a temporal change of an intensity envelope, or the like. As a classification method, techniques such as similarity determination, pattern discrimination, and machine learning may be combined and used.

With regard to these pieces of detection/classification processing, an evaluation based on division into frequency bands is preferably performed (to be described later).

The data primary processing unit 22 examines, based on collation to a classification condition, whether a known abnormal event is included in acquired environment information and when a known abnormal event is included, outputs, to the monitoring server 30, at least a type, and an occurrence time and a location of a relevant abnormal event as abnormal event data. According to a type of an abnormal event, accompanying information such as a detection intensity (e.g., a magnitude of a vibration, or the like) of the abnormal event is output together.

[Event Classification Condition]

An event classification condition is prepared in such a way that even when an installation status or the like of a submarine cable 10 is different, an event can be correctly detected/classified. A method for this matter is to find a feature being unlikely to be affected by an installation status or the like of a cable and being present only at an abnormal time and perform classifications, based on the feature. Even when same events cannot be classified due to an installation status or the like of a submarine cable 10, the same events may be associated with the same event type in such a way as to be detected based on any one of a plurality of classification conditions.

[Method of Acquiring Appropriate Classification Condition]

In order to increase reliability of these classifications, it is important to previously acquire many pieces of example data of a sound at a normal time and a sound at an abnormal time, find a feature present only in a sound at an abnormal time, and set the feature as a classification condition. When the number of pieces of example data is insufficient, it is desirable to generate events at a normal time and at an abnormal time in a simulated manner, acquire a sound and a vibration at the time of the events by using a submarine cable 10 placed in various statuses, and achieve a classification condition with higher reliability.

For example, the data primary processing unit 22 collects, for a plurality of cases, as a non-abnormal pattern, environment information acquired when the above-described working means appropriately moves or installs a construction-material cable. Further, the data primary processing unit 22 collects, for a plurality of cases, as an abnormal pattern, environment information acquired when an erroneous operation, a failure, or the like is intentionally caused to occur and a construction-material cable is scratched. A feature which is scarcely included in a non-abnormal pattern but is commonly found in an abnormal pattern is found and set as a classification condition.

[Detection/Classification in which Acquired Information is Divided into Frequency Bands]

The event detection function unit 22 desirably detects/classifies, when detecting/classifying environment information, environment information after dividing the environment information with respect to each frequency band. Whether an event is included in data divided into each band is determined based on a classification condition. Division with respect to each frequency band is, for example, a method for dividing into ranges such as an extremely low frequency to 0.01 Hz, 0.01 to 0.1 Hz, 0.1 to 1 Hz, 1 to 10 Hz, and 10 to 100 Hz. However, in order not to omit detection of an event present in the vicinity of a boundary between bands, bands are desirably overlapped to some extent. An abnormal event may be classified/determined based on a combination of detection results of a plurality of these frequency bands.

Environment information data are detected/classified based on division into frequency bands, and thereby when a signal which does not need to be detected but has a large amplitude is present at the same time as a signal to be detected, these signals may be separated based on a frequency. Thereby, detection/classification with higher reliability is enabled.

A data size greatly differs according to a frequency band, and therefore dividing with respect to each frequency band has an advantage of easily executing arithmetic processing such as pattern discrimination.

Herein, original (before division into frequency bands) sensing data including the event detection portion may be also output to and recorded in the monitoring server 30, regardless of whether to be used in an event classification function unit 23. The original sensing data are usable, for example, when detailed analysis is to be made later (offline). It is desirable to set a programmable specification as such in order to enable detailed setting for an operation according to an application or a status.

[Tracking of Contact Point between Working Means and Construction-Material Cable]

The data primary processing unit 22 determines, based on environment information and a non-abnormal pattern, a location making contact with a working means from among locations of a construction-material cable. Specifically, the data primary processing unit 22 detects, when a non-abnormal pattern relevant to a working means is detected, from environment information in a certain location present on a construction-material cable, that the construction maternal cable and the working means make contact with each other in the location. When a construction-material cable passes through the working means one after another, the same event is detected continuously while moving in locations on the cable. Therefore, the data primary processing unit 22 is provided with a model in which a contact point with a working means is moving on a cable and thereby, can perform discrimination tracking for the contact point.

The data primary processing unit 22 takes a correlation between a state of a working means acquired from a monitoring sensor attached to the working means and environment information acquired from an optical fiber, and thereby may determine a type and a contact location of the working means. Specifically, the data primary processing unit 22 evaluates similarity between a state (e.g., a vibration or a temperature) of a working means and environment information of a construction-material cable in a location making contact with the working means and thereby, can unmistakably discriminate a type and a contact location of the working means.

Note that, an abnormal event may be detected based on a state of a working means acquired from a monitoring sensor attached to the working means and environment information in the vicinity of a contact point, acquired from an optical fiber.

The data primary processing unit 22 may further certainly determine a working means making contact with a cable by attaching a vibration generator to a working means and a unique vibration is transmitted to a construction-material cable. Thereby, even when a plurality of working means generating similar working sounds come close to and make contact with a cable, contact locations of the working means and types of the working means can be unmistakably discriminated.

The vicinity of a contact point between these working means and a construction-material cable is a spot where vibration associated with work is heavily present, and has a high damage risk and therefore, is a special spot to be focused. Therefore, in a vicinity of a contact point, an event classification condition or a detection threshold value different from a general section other than the vicinity is applied, for example, and thereby reliability in damage risk detection can be further increased.

A process management control system 31 to be described later in detail transmits, in advance of work, a type of each working means, an approximate disposition interval, and the like to the data primary processing unit 22. The data primary processing unit 22 prepares therein a model for tracking each working means, based on the information from the process management control system 31. Thereby, a contact point between a working means and a construction-material cable is further certainly discriminated, and thereby reliability in detection/classification of a damage risk is increased.

It is necessary for the process management control system 31 to monitor which part of a construction-material cable passes through which working means. As described above, the data primary processing unit 22 is able to track a contact point between a construction-material cable and each working means and thereby able to provide useful information for the process management control system 31.

[Information Cooperation with Process Management Control System]

These sections having a high risk, i.e., a section from exit of a submarine cable 10 from a CS to bottoming and a section through which a burying machine passes move with advance of cable laying. In a CS, laying is advanced by recognizing and controlling, in real time, which part of the submarine cable 10 is currently paid out from the CS, which part passes through a burying machine, and the like. The process management control system 31 and the monitoring server 30 of the cable protection monitoring system 1 desirably share information mutually.

The process management control system 31 internally stores, as map data, at least installation-scheduled route information of a submarine cable section to be subjected to installation from now and route information of an installed-cable section. A map (referred to as nautical chart in case of sea) commonly includes, in addition to map data available for general purchase, detailed data acquired based on conducted surveying commonly conducted before laying in order to study a laying route of the submarine cable 10.

In laying of the submarine cable 10, a submarine cable 10 as a finally-completed form cannot be laid at once, and therefore, generally, work is advanced in such a way that a certain unit of construction block is laid and laid blocks are connected. In particular, in a connection point between the blocks, a submarine cable 10 having an extra length for being drawn up from the sea bottom is temporarily added or a surplus length becoming unnecessary during connection is cut off. In other words, during laying construction, specifically, mainly in a cable connection point, information about a length of a submarine cable 10 or the like changes. Information of the change is acquired in the process management control system 31 as needed, and guided in such a way as to finally achieve a construction result as planned. The information of a change of the submarine cable 10 is also acquired in the monitoring server 30, as needed.

The process management control system 31 acquires, from general society, information such as a tide/marine weather information, fishing activity information, vicinity work information, and a water channel report/navigation warning information relating to a submarine cable route periphery.

As described above, in the cable protection monitoring system 1 according to the first example embodiment, the monitoring server 30 detects an abnormal event in each location of a construction-material cable. Therefore, the cable protection monitoring system 1 is able to recognize, in real time, during work for a construction-material cable, an abnormal event having a possibility of damaging the construction-material cable together with an accurate location of the abnormal event even in a vibration and noise associated with the work. Therefore, according to the cable protection monitoring system 1 of the first example embodiment, work can be temporarily stopped within a short time after abnormal event occurrence, and a location of the occurrence is confirmed by winding a construction-material cable up to a point where visual confirmation is enabled and a countermeasure such as repair and reinforcement is taken, thereby a loss can be reduced to a minimum level. In other words, according to the cable protection monitoring system 1 of the first example embodiment, during work for handling a cable as a construction material, when an abnormal event having a possibility of damaging the cable occurred but failed to detect in real time, increase of damage due to the work being advanced may be suppressed. In the cable protection monitoring system 1, a construction-material cable itself functions as a sensor, and thereby detailed and real-time monitoring having been unable to be performed so far can be performed and as a result, a cost reduction effect such as reduction of the number of security guards or warning ships regulating enter into a work range is exhibited.

When a work-state submarine cable 10 is a sensing target, the DAS interrogator 20 and the submarine cable 10 are tentatively connected in many cases. A location of a connection point between the DAS interrogator 20 and the submarine cable 10 is most easily ensured on a laying construction ship holding an end point of the submarine cable 10. When an end point of a submarine cable 10 is reached to a land, it is conceivable that the DAS interrogator 20 and the submarine cable 10 are connected on the land.

Such a temporal connection form is described according to the following example embodiment.

Second Example Embodiment

According to the first example embodiment, a submarine cable 10 during laying has been described as merely a cable, but actually, a submarine device such as an optical amplification repeater requiring power supply is inserted every several tens of kilometers. A general optical amplification repeater does not transmit a sensing signal, and therefore a range which can be monitored from the DAS interrogator 20 temporarily connected to a cable end on board is a range up to a first optical amplification repeater tracked back from the DAS interrogator 20. When the above-described caution-needed work section (a section having a high risk) is present ahead of an optical amplification repeater, there is a problem that an important section cannot be monitored.

Therefore, according to the second example embodiment, a device as described below is added to a submarine cable 10 and a repeater in the cable protection monitoring system 1 according to the first example embodiment.

Figure 5:
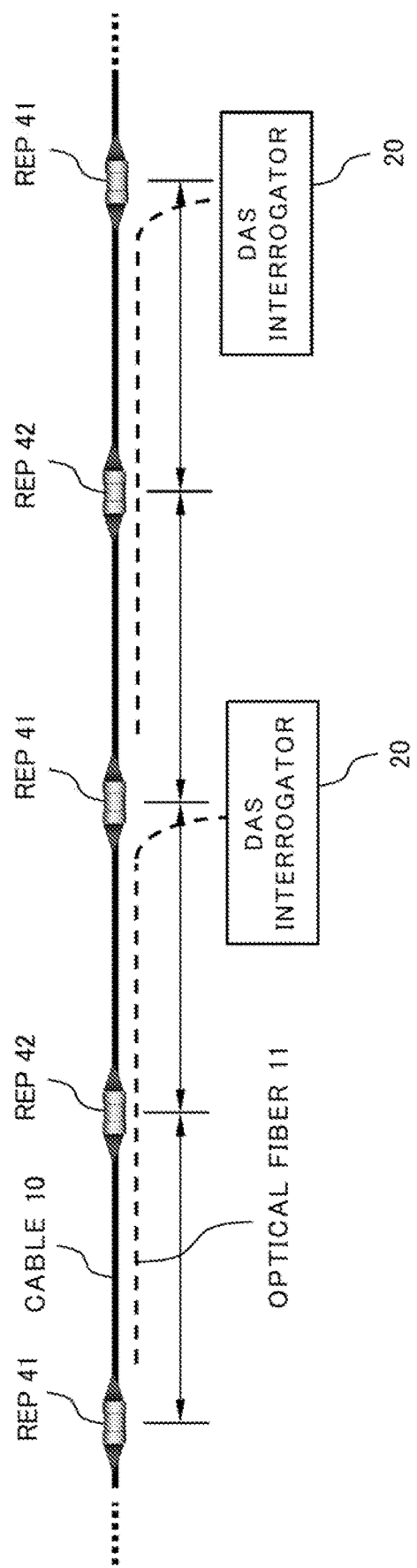
FIG. 5 is a schematic diagram for describing a second example embodiment.

FIG. 5 illustrates a schematical diagram for the device. One optical fiber 11A for sensing is added to the submarine cable 10. The optical fiber 11 is caused to pass by a repeater (REP) 42, is separated from a main-line optical fiber by a cable coupling unit of a repeater 41, and is drawn out as a monitor cord 50. The monitor cord 50 is temporarily connected with the DAS interrogator 20. The repeaters 41 and 42 are also referred to as an optical amplification repeater. While sensing light is not subjected to optical amplification repeating, a range able to be monitored by one DAS interrogator 20 is approximately 100 km, and therefore it is assumed that in an optical amplification repeater present in the range, a sensing optical fiber is through-connected. The through-connection herein indicates that an optical fiber 11 is inserted into a repeater body 43 integrally with the main-line optical fiber, is caused to pass by an optical amplifier without being passed through the optical fiber, and is caused to exit from the repeater body 43 integrally with the main-line optical fiber.

Figure 6:
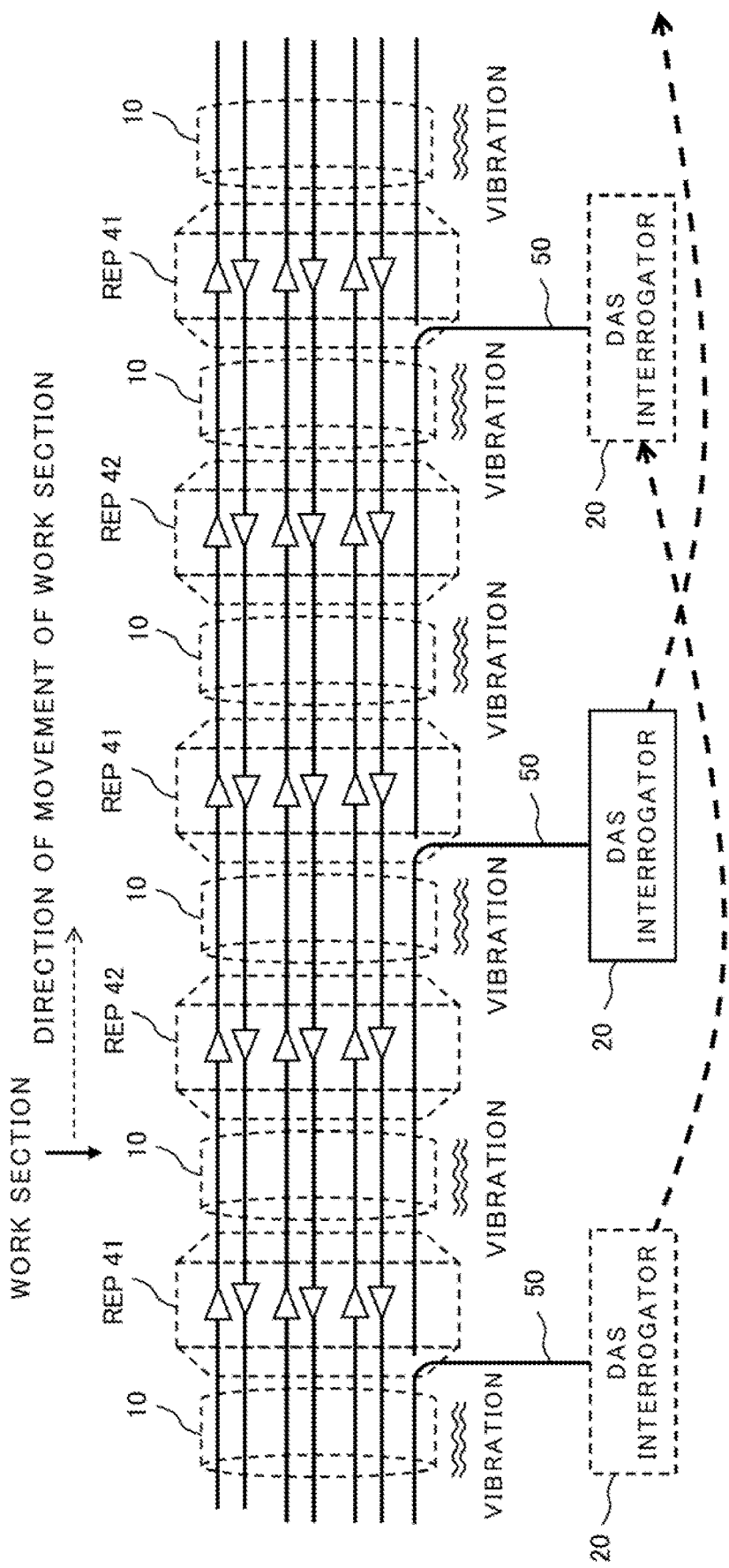
FIG. 6 is a connection description diagram according to the second example embodiment.

FIG. 6 schematically illustrates wiring of an optical fiber core wire inside a submarine cable 10 and an optical amplification repeater in a submarine cable 10 during laying construction applied with the present example embodiment. According to an embodiment illustrated in FIG. 6, one DAS interrogator 20 is able to monitor a cable length of 100 km or more, and therefore monitoring can be performed by including a largest caution-needed work section. With movement of a work section, a monitor terminal connected to the DAS interrogator 20 is transferred nearer to an inboard tank side.

As illustrated in FIG. 6, when a plurality of DAS interrogators 20 (in FIG. 6, two units) are prepared and monitor terminals are moved alternately, a non-monitoring time zone during interrogator connection switching can be minimized.

Figure 7:
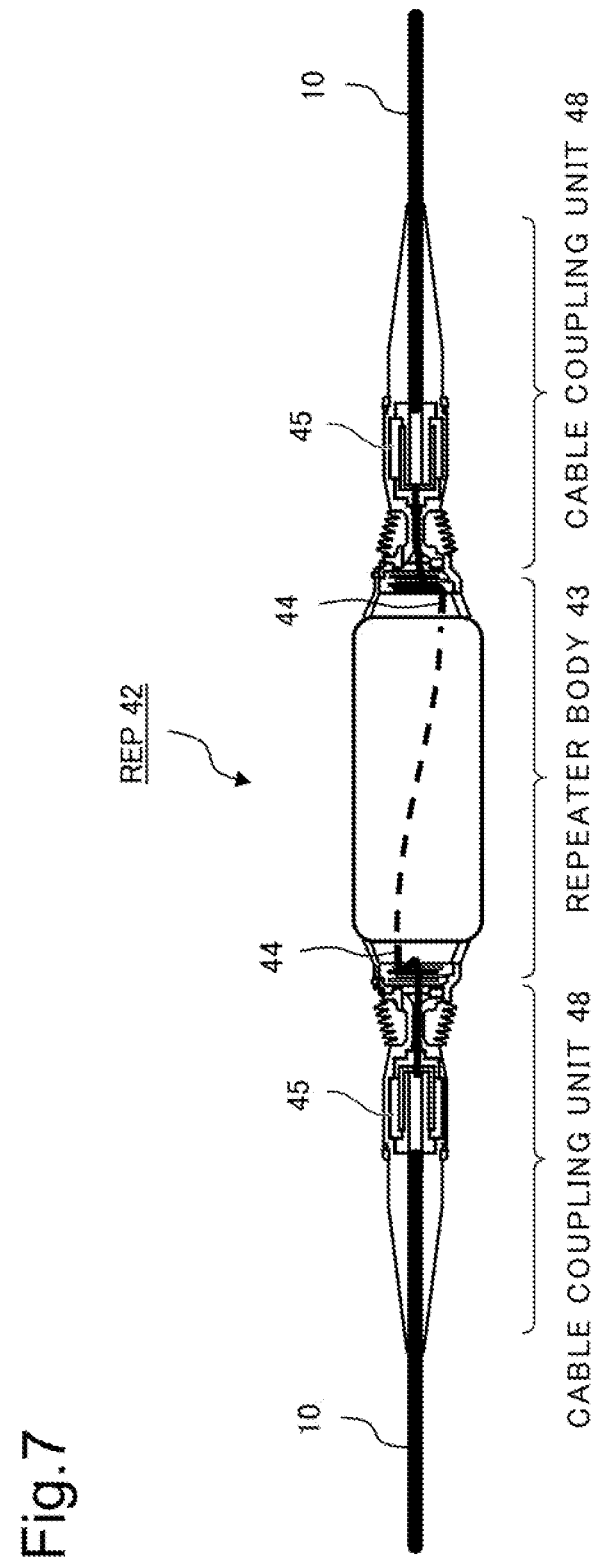
FIG. 7 is a description diagram of through-connection optical wiring in a repeater.

FIG. 7 is a diagram illustrating a configuration and connection of the repeater (REP) 42. The repeater 42 includes a repeater body 43 and a cable coupling unit 48 coupled before and after the repeater body 43. Between the repeater body 43 and the cable coupling unit 48, a gimbal mechanism 46 (to be described later) is provided in such a way as to freely bend up to an angle to some extent. An optical fiber 11 in a submarine cable 10 and an optical fiber cable (tail cable 44) leading to a repeater inside are connected in a joint chamber 45 inside the cable coupling unit 48. A connection structure of the submarine cable 10, the cable coupling unit 48, and the repeater body 43 illustrated in FIG. 7 is a structure generally used.

Herein, a core wire used for sensing according to the present example embodiment is wire-connected in such a way as to pass by an inside of the repeater body 43 as illustrated with a dotted line in the repeater body 43 of FIG. 7. As can be seen with reference to FIG. 6, with regard to all repeaters 41 and 42, in the repeater body 43, this connection is employable, and therefore it is unnecessary to divide types.

A difference between the repeaters 41 and 42 is a difference of whether from a connection unit between the repeater body 43 and a cable coupling unit, a monitor cord 50 of a sensing optical fiber core wire is drawn. Herein, a cable coupling unit from which a monitor cord 50 is drawn is referred to as 49, and a normal cable coupling unit from which a monitor cord 50 is not drawn is referred to as 48. FIG. 7 is a diagram describing a repeater 42 coupled with a cable coupling unit 48 from which a monitor cord 50 is not drawn. In the repeater 42, a sensing optical fiber core wire is connected similarly to another optical fiber core wire.

Meanwhile, as illustrated in FIG. 6, the repeater 41 has a structure where a monitor cord 50 is drawn. In FIG. 6, a cable coupling unit is schematically illustrated as a trapezoid present between a cable 10 and a repeater body. In a cable coupling unit 49 on a left side of the repeater 41 illustrated in FIG. 6, a monitor cord 50 connected to a sensing optical fiber core wire in a submarine cable 10 is drawn to the outside. The drawn monitor cord 50 is used for monitoring a cable during movement or during installation. A sensing optical fiber core wire on a repeater body side is optically terminated in a joint chamber 45 (to be described later) inside the cable coupling unit 49.

Figure 8:
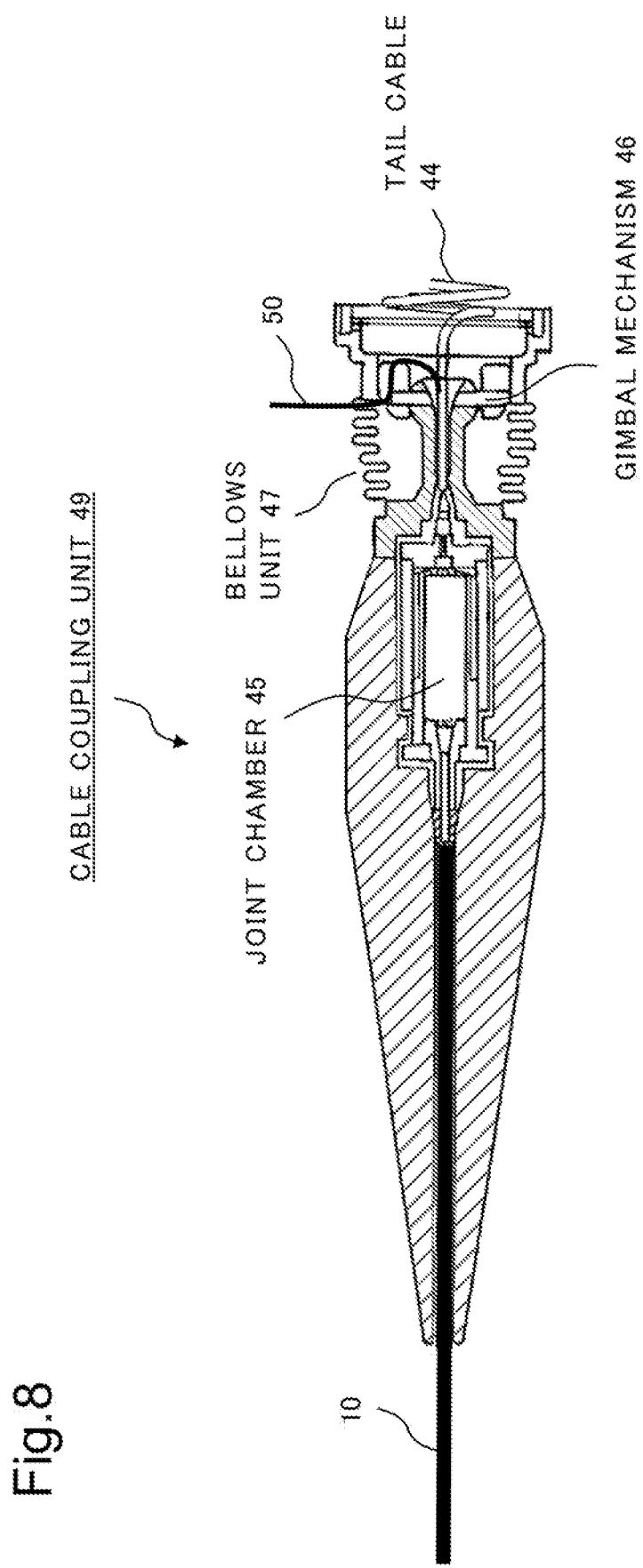
FIG. 8 is a description diagram of an example of a leading structure of a monitor terminal according to the second example embodiment.

FIG. 8 is a cross-sectional schematic diagram of the cable coupling unit 49 having a structure where a monitor cord 50 is drawn. An optical fiber on a submarine cable 10 side and an optical fiber on a repeater body side are connected in the joint chamber 45.

A sensing optical fiber core wire in the submarine cable 10, for example, is passed through a gimbal mechanism, similarly to the tail cable 44, from the joint chamber 45, is drawn from a bellows unit 47 of a connection unit to the outside, and is formed as a monitor cord 50. Meanwhile, a sensing optical fiber core wire on the repeater body 43 side is optically terminated in the joint chamber 45. The tail cable 44 is a wiring material resistant to high water pressure, but the monitor cord 50 is used before being dropped under water and therefore, does not need to be designed in such a way as to be resistant to high water pressure.

Figure 9:
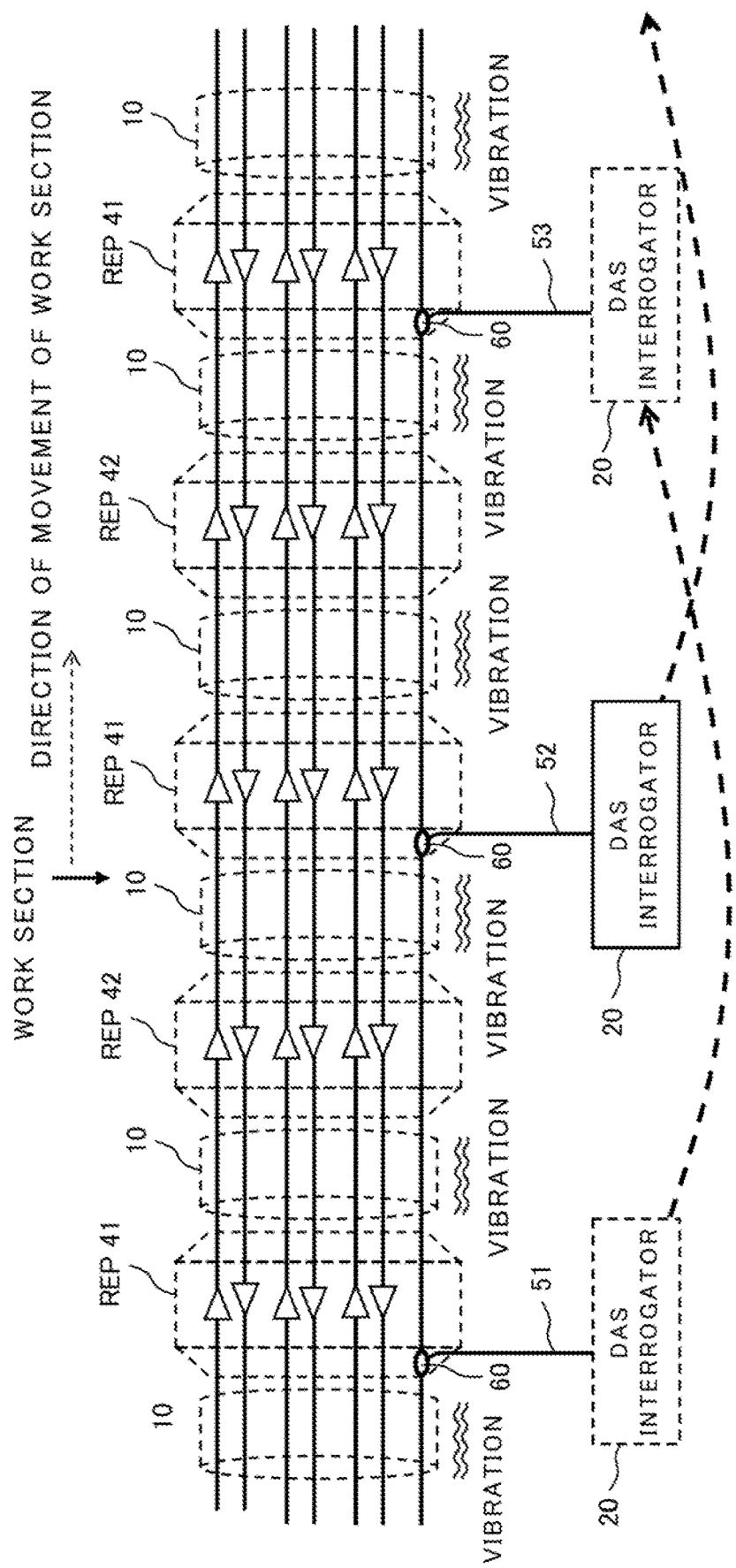
FIG. 9 is a connection description diagram according to the second example embodiment.

FIG. 9 is another example according to the present example embodiment. The example is a cable protection monitoring system 1 further including a device for not generating a non-monitoring time zone during interrogator connection switching. The cable protection monitoring system 1 in the example includes a configuration in which in the joint chamber 45 inside the above-described cable coupling unit 49, an optical coupler 60 that branches a sensing optical fiber is disposed and the branched optical fiber is drawn to the outside as a monitor terminal. In FIG. 9, for description convenience, the monitor cord 50 is referred to as 51, 52, or 53 according to a difference of a location.

In the configuration of FIG. 6, when a work section comes close to a monitor cord 52, it is necessary to also pay out, from a CS 15, a repeater 41 from which the monitor cord 52 is drawn. Therefore, it is necessary to cut connection between the DAS interrogator 20 and the monitor cord 52. Therefore, in the configuration of FIG. 6, there is a problem that it is difficult to monitor a section immediately before the repeater 41 during construction. Therefore, as in FIG. 9, switching is made to monitoring from the next monitor cord 53 via an optical coupler 60. By doing do, while a loss due to insertion of the optical coupler 60 is added, a range monitored from the monitor cord 52 is not reached up to the repeater 41 but may be a slight anterior portion beyond the repeater 41, and thereby a non-monitoring section can be eliminated.

As further another example, in FIG. 6, a termination point of a sensing optical fiber core wire is not located in the cable coupling unit 49 but is extended slightly further, and thereby a non-monitoring section may be eliminated. However, in this case, the number of core wires of a submarine cable 10 is partially increased and types are increased, and therefore a management cost for preventing a type mistake and a cost of an extra cable are increased. In order not to increase types, it is necessary to use two sensing optical fiber core wires in every section, and therefore this manner is also not economical.

As still further another example, in FIG. 6, two sensing optical fiber core wires on both of right and left sides are drawn from a cable coupling to the outside and may be connected with a bidirectional optical amplifier. Thereby, a distance sensed by an interrogator is extended. By doing so, an advantageous effect that connection switching work of an interrogator is reduced is exhibited. However, in this configuration, a problem that when a work section comes close to a repeater 41 and connection to a monitor cord 50 is cut, the work section cannot be monitored, is not resolved. When tentative connection is made by directly connecting monitor cords 50, it is conceivable that a short distance can be monitored, but the monitor cords 50 are present outside the bellows unit 47 and therefore, is highly likely to be cut during passage of a construction machine. When passage is allowed, it is necessary to make connection inside a joint chamber 45 of a cable coupling unit 49, but it is difficult to balance the connection with temporal insertion of an optical amplifier through a monitor cord.

As described above, in the cable protection monitoring system 1 according to the second example embodiment, a further device is added to the cable protection monitoring system 1 according to the first example embodiment. Therefore, the cable protection monitoring system 1 according to the second example embodiment exhibits an advantageous effect similar to the cable protection monitoring system 1 according to the first example embodiment. In addition, according to the cable protection monitoring system 1 of the second example embodiment, as described above, sensing light transmitted/received by the DAS interrogator 20 performs sensing by using an optical fiber 11 not passing through an optical amplifier. Therefore, the cable protection monitoring system 1 according to the second example embodiment is able to also monitor, from the DAS interrogator 20, a section on a construction-material cable in an anterior portion beyond an optical amplification repeater.

Third Example Embodiment

In the cable protection monitoring system 1 according to the second example embodiment, in order to achieve sensing for an anterior portion beyond an optical amplification repeater device that do not operate without power supply, an embodiment in which a work-monitoring sensing optical fiber through-connected to an optical amplification repeater is added inside a submarine cable 10 has been made. Meanwhile, in a cable protection monitoring system 1 according to a third example embodiment, a monitoring sensing optical fiber is not added, but a communication optical fiber core wire is used in the cable protection monitoring system 1 according to the first example embodiment. Power is partially supplied to an optical amplification repeater of a (communication) optical fiber core wire that at least performs sensing.

Figure 10:
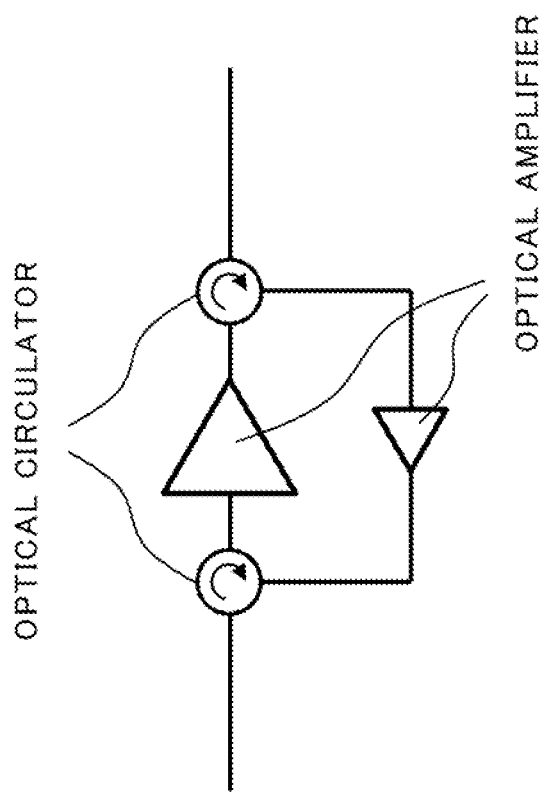
FIG. 10 is a description diagram of one example of a bidirectional optical amplifier.

A general optical amplifier has a configuration including an isolator and reflection return light of sensing light is inhibited. With regard to this matter, for at least a portion that amplifies/repeats sensing light, a configuration of a bidirectional optical amplifier may be made, for example, as illustrated in FIG. 10.

However, in a conventional optical amplification repeater device, power cannot be supplied only to some of a plurality of optical amplification repeaters in the repeater device, and when an operation is performed, operations for a total number of optical amplification repeater devices are performed, and therefore high supply voltage is required. During laying work, in some cases, power is temporality supplied for an operation test or the like but a worker needs to move away from a submarine cable 10 in order to prevent an electric shock accident, and therefore there has been a problem in construction work during power supply testing.

Therefore, a device is applied to a power supply circuit in an optical amplification repeater, and thereby based on even a supply current value lower than during normal operation, a least an optical amplifier required for sensing light is driven. It is assumed that this matter is referred to as a monitoring mode.

There is one power supply line in a submarine cable system, and a power supply circuit using a land (under the sea) as a return line is common. A predetermined constant current is caused to flow through a power supply line in a submarine cable 10, and thereby series-connected loads are operated.

Figure 11:
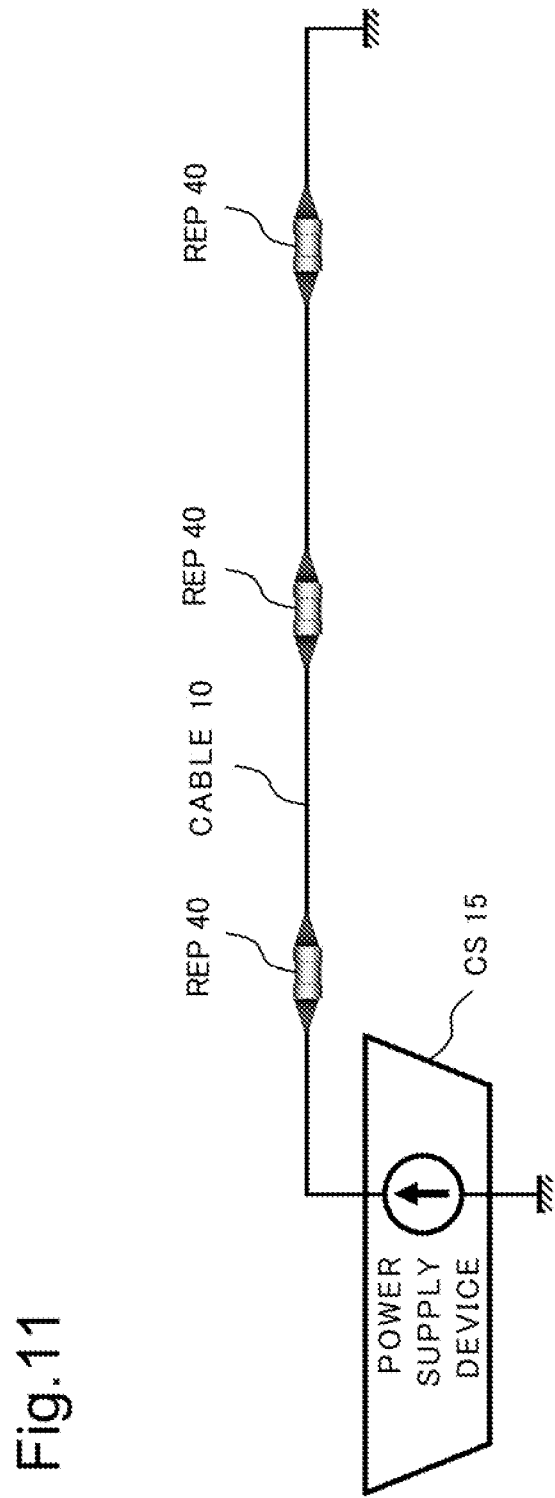
FIG. 11 is a description diagram of an example of a tentative power supply method during laying work.

As schematically illustrated in FIG. 11, even during construction work, a power supply device is disposed in a CS 15 and is connected to a working-state submarine cable 10, and thereby power supply for testing is achieved.

Figure 12:
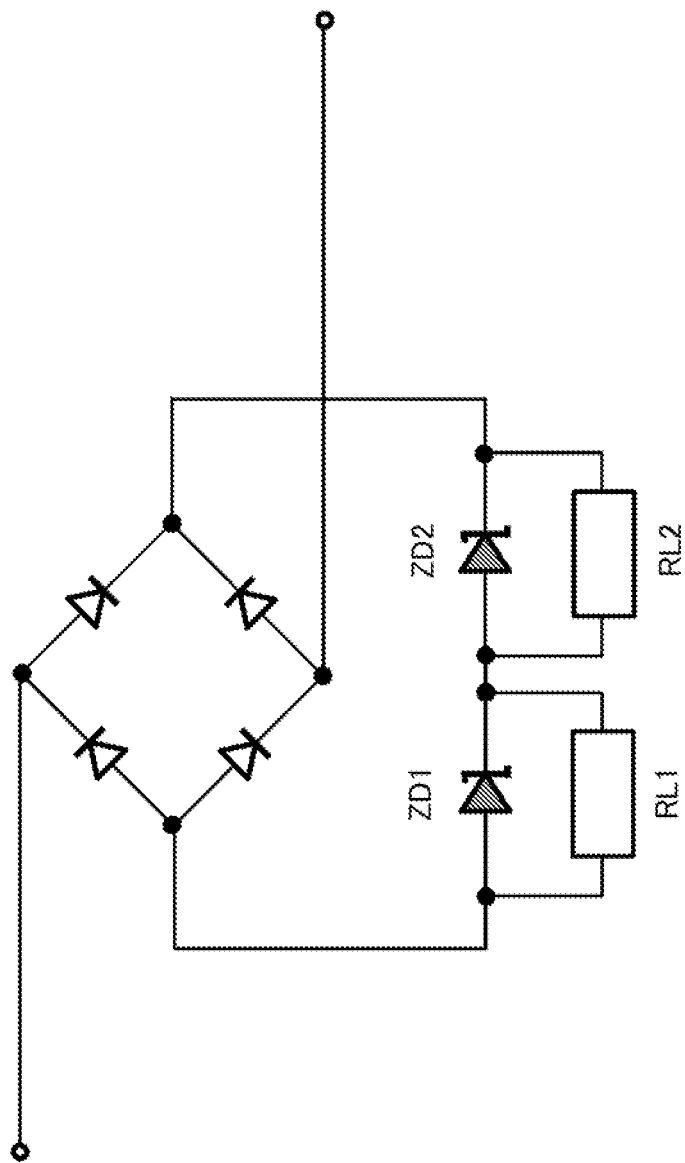
FIG. 12 is an achievement example of a power supply circuit according to a third example embodiment.

A basic configuration of a power supply circuit in a repeater body 43 is a constant voltage circuit using a Zener diode (ZD). One achievement example is illustrated in FIG. 12. On an upper side, there is a diode bridge (full-wave rectifier) for performing an operation, regardless of a supply current direction. A load RL1 is driven by a power supply generated by a Zener diode ZD1, and a load RL2 is driven by a power supply generated by a Zener diode ZD2. The two circuits are series-connected, and therefore the same current flows.

Herein, a circuit of the ZD 2 and the RL 2 is designed in such a way as to start based on current lower than a circuit of the ZD1 and the RL1. When such a configuration is made, only the RL2 can be operated based on current less than current for operating all circuits. At that time, in the circuit of the ZD1 and the RL1, a major part of current flows in the RL1 and a voltage on a side of the ZD1 and the RL1 is lower than a Zener voltage of the ZD1, and therefore a voltage of the entire device is also low, compared with a case where all circuits are operated. When a circuit for driving an optical amplifier required for sensing light is included in the load RL2, the above-described monitoring mode is achieved.

Figure 13:
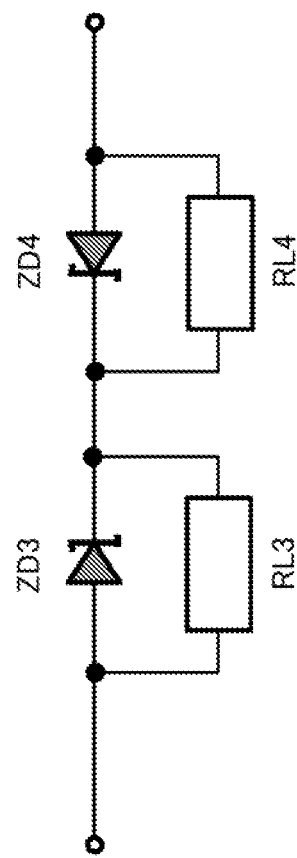
FIG. 13 is an achievement example of a power supply circuit according to the third example embodiment.

Another achievement example is illustrated in FIG. 13. In the power supply circuit, according to a supply current direction, an operating circuit is switched. When flowing is performed from right to left, an RL3 is operated, and when flowing is performed from left to right, an RL 4 is operated. The RL3 drives all circuits while the RL4 drives only an optical amplifier required for sensing light, and thereby the above-described monitoring mode is achieved.

Figure 14:
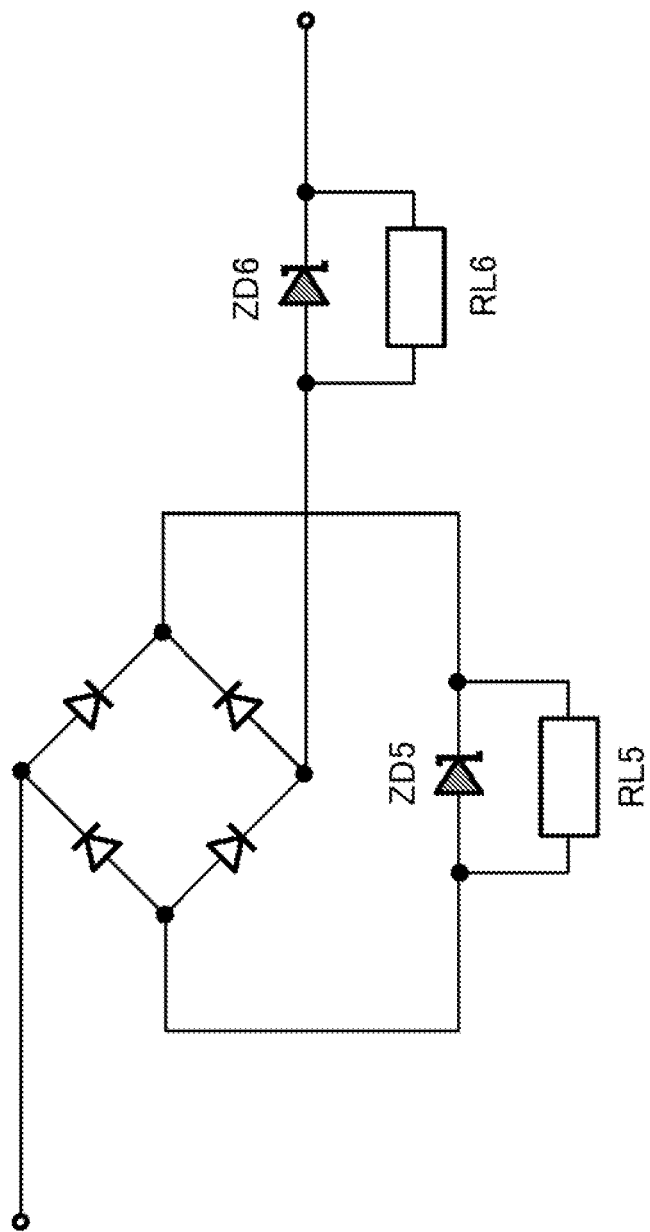
FIG. 14 is an achievement example of a power supply circuit according to the third example embodiment.

A further another achievement example is illustrated in FIG. 14. Compared with FIG. 13, while an RL 5 operates regardless of a power current direction, an RL6 operates only when current flows from right to left. When current is caused to flow from left to right, only an optical amplifier required for sensing light driven by the circuit RL5 is operated, and thereby the above-described monitoring mode is achieved.

These techniques for switching an operation circuit according to an amount or a direction of current are well-known or are a disclosed technique, for example, as in PTL 5, and therefore even when a method other than the examples cited herein is employed, a monitoring mode can be achieved by using the method.

By doing so, supply voltage is reduced to a lower level. A specific example is described. A supply voltage required for a submarine cable 10 configured as a series length of ten repeaters having a total length of 770 km and a repeater interval of 70 km is calculated. It is assumed that a resistance value of a submarine cable 10 is 1 Ω/km, and with respect to a repeater, a supply current at a normal time is 1 A, a voltage at the time is 50 V, a supply current during a monitoring mode is 0.2 A, and a voltage at the time is 25 V.

For a supply voltage at a normal time, a voltage of 1270 V being a total of 770 V for a cable and 500V for a repeater is required. A supply voltage during a monitoring mode is a total of 404 V of 154 V for a cable and 250V for a repeater and drive is made possible at a voltage to an extent half a voltage at a normal time.

According to a configuration of the example, even with normal drive current, an optical amplifier required for sensing light operates without trouble, and therefore while being operated as a communication cable, the optical amplifier can also sense environment information of a periphery of a submarine cable 10. Communication light and sensing light may share one optical fiber by using a wavelength division multiplexing technique.

The configuration is also usable for applications in which various types of submarine environment monitoring for an earthquake and the like are performed and it is detected that any abnormal vibration is applied to a submarine cable 10 installed on the sea bottom.

As described above, the cable protection monitoring system 1 according to the third example embodiment is configured by adding a further device to the cable protection monitoring system 1 according to the first example embodiment. Therefore, the cable protection monitoring system 1 according to the third example embodiment exhibits an advantageous effect similar to the first example embodiment. In addition, an optical amplification repeater in the cable protection monitoring system 1 according to the third example embodiment includes an optical amplifier capable of performing amplification repeat of sensing light and further includes a power supply circuit including an operation mode an operation range of which is narrowed down to the optical amplifier, and thereby is able to perform monitoring while a supply voltage to a construction-material cable is reduced even during work for the construction-material cable.

Fourth Example Embodiment

Figure 15:
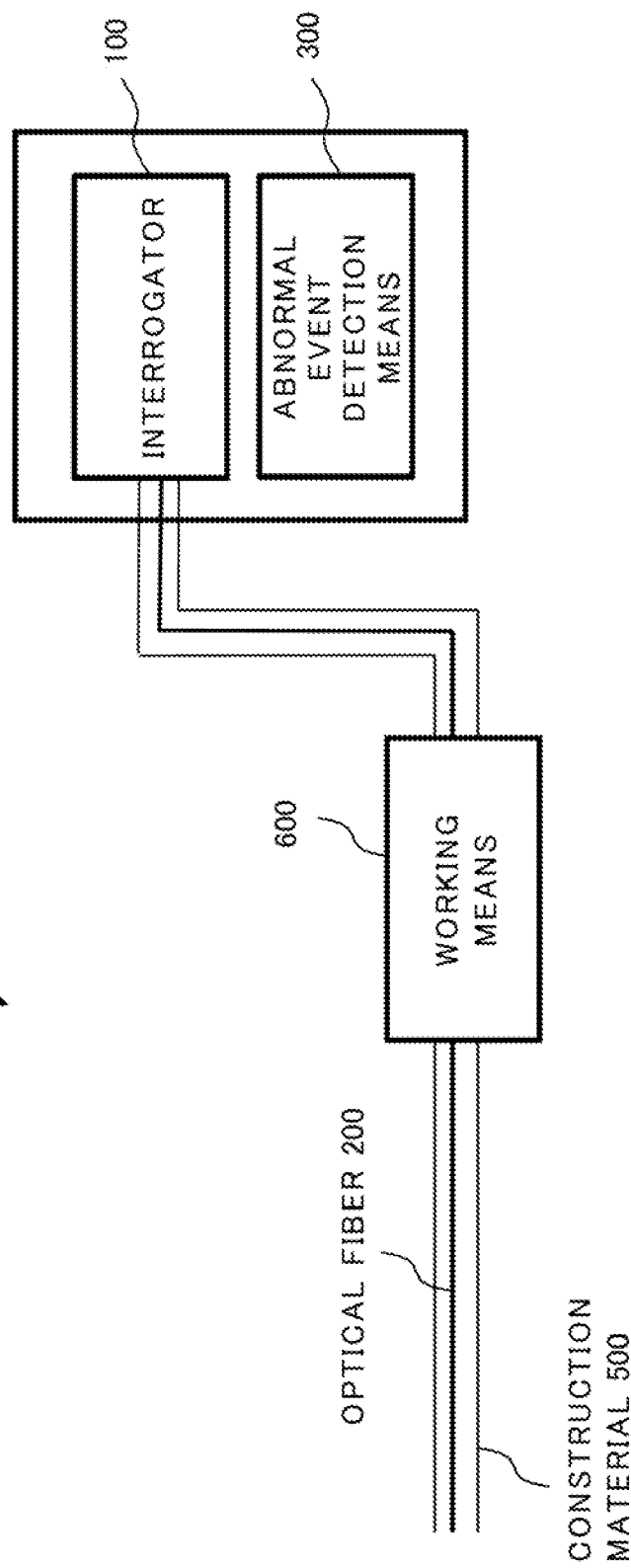
FIG. 15 is a schematic diagram illustrating a configuration example according to a fourth example embodiment.
Figure 16:
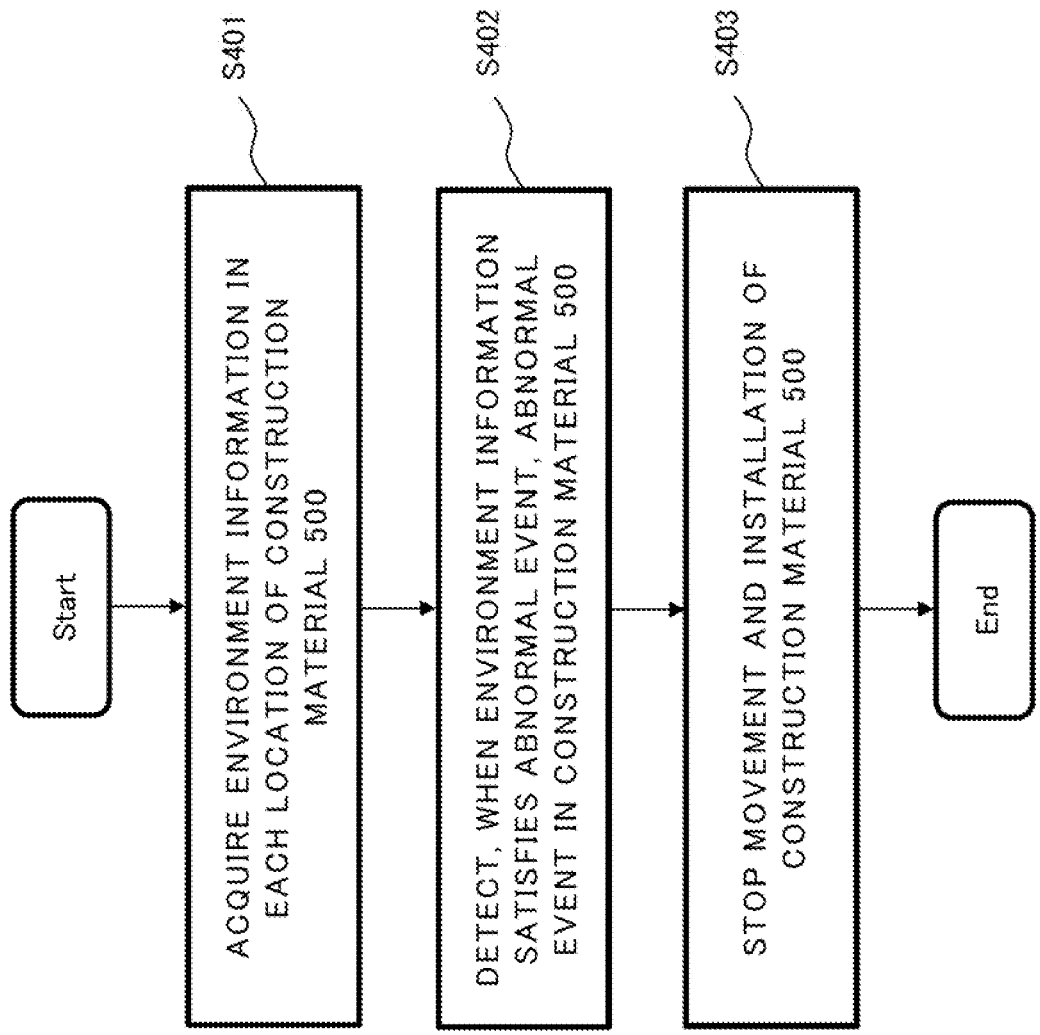
FIG. 16 is a flowchart illustrating an operation according to the fourth example embodiment.

With reference to FIGS. 15 and 16, a cable protection monitoring system 4 is described. FIG. 15 is a block diagram illustrating a configuration example of the cable protection monitoring system 4. FIG. 16 is a flowchart illustrating an operation example of the cable protection monitoring system 4. As illustrated in FIG. 15, the cable protection monitoring system includes a working means 600, an interrogator 100, and an abnormal event detection means 300.

The working means 600 moves and installs a wire cable-shaped construction material 500 including an optical fiber 200 having at least one core. The interrogator 100 acquires environment information in locations of a construction material 500 sensed by the optical fiber 200.

The abnormal event detection means 300 detects, when environment information acquired in each location of the construction material 500 satisfies an abnormal pattern, an abnormal event in each location. When an abnormal pattern is detected, the working means 600 stops moving and installing the wire cable-shaped construction material 500.

Next, by using FIG. 16, an operation of the cable protection monitoring system 4 is described. Note that, at a time of starting the following operation, it is assumed that the working means 600 has already started moving and installing a construction material 500.

The interrogator 100 acquires environment information in each location of the construction material 500 (S401).

The abnormal event detection means 300 detects, when the acquired environment information satisfies an abnormal pattern, an abnormal event in the construction material 500 (S402). The abnormal event detection means 300 may further determine, in the construction material 500, a location where an abnormal event is detected as a location to be repaired.

The working means 600 stops moving and installing the construction material 500 (S403).

As described above, in the cable protection monitoring system 4, the abnormal event detection means 300 detects an abnormal event in each location of a construction material 500. Therefore, the cable protection monitoring system 4 detects, in real time during cable work, an abnormal event having a possibility of damaging a cable together with an accurate location of the abnormal event even, in a vibration and noise associated with work and therefore, can stop the work. Therefore, a regression loss can be reduced to a minimum level. In other words, according to the cable protection monitoring system 4 of the fourth example embodiment, during work for handling a cable as a construction material, when an abnormal event having a possibility of damaging the cable occurred but failed to detect the abnormal event in real time, spreading of loss due to the work being advanced may be prevented. The cable protection monitoring system 4 is able to perform, by causing a submarine cable itself to function as a sensor, detailed and real-time monitoring having been difficult so far and thereby exhibits a cost reduction effect such as reduction of the number of security guards or warning ships regulating enter into a work range.

Modified Example

According to the example embodiments, as a method for optical fiber sensing, DAS has been described as an example, but other methods such as DVS, DTS, and BOTDR is employable. Herein, DVS is an abbreviation for distributed vibration sensing, DTS is an abbreviation for distributed temperature sensing, and BOTDR is an abbreviation for Brillouin optical time-domain reflectometry.

Optical fiber sensing capable of performing sensing in a wide and distributed manner other than an OTDR method is employable. PTL 4 and NPL 3, for example, disclose not an OTDR method using reflection return light but a distribution-type optical fiber sensing technique using transmitted light.

According to the example embodiments, description has been made by using an example during work for a submarine cable, but needless to say, a laid cable section during a cable laying construction period or an operation during a temporal construction suspension period is applicable.

According to the example embodiments, description has been made mainly for a communication submarine cable, but even for a submarine power cable including an optical fiber and a submarine pipeline laid along an optical fiber, monitoring using the present disclosure is made possible.

According to the example embodiments, description has been made by using an example in which a cable is used in the sea, but even an operation in a river or a lake is effective.

According to the example embodiments, description has been made by using an example in which a cable is used in water, but an underground cable, an overhead cable, or the like is applicable similarly.

According to the example embodiments, description has been made by using an example in which optical fiber sensing is used as a detection means of a sound or a vibration sensed by a submarine cable, but a sensor element of a sound or a vibration included in a submarine device is mounted and detection may be performed by using the sensor element.

According to the example embodiments, description has been made by using an example of monitoring based on a phenomenon of a sound or a vibration as environment information sensed by a submarine cable, but for example, a temperature change is applicable.

The whole or part of the example embodiments disclosed above can be described as, but not limited to, the following supplementary notes.

Supplementary Note 1

A working-state cable protection monitoring system including:
a working means that moves or installs a wire cable-shaped construction material including an optical fiber having at least one core;
an interrogator that acquires environment information in each location of the construction material being sensed by the optical fiber; and
an abnormal event detection means that detects, when the environment information acquired in the location satisfies an abnormal pattern, an abnormal event in the location, wherein
the working means stops movement and installation of the wire cable-shaped construction material when the abnormal event is detected.

Supplementary Note 2

The working-state cable protection monitoring system according to supplementary note 1, wherein
the abnormal event detection means corrects, based on a production record or an installation record of the construction material or by acquiring a degree of sensing with respect to each location of the construction material, a sensing sensitivity for the environment information with respect to each location of the construction material and then detects an abnormal pattern.

Supplementary Note 3

The working-state cable protection monitoring system according to supplementary note 1 or 2, wherein the abnormal event detection means divides the acquired environment information into frequency bands and then detects an abnormal pattern.

Supplementary Note 4

The working-state cable protection monitoring system according to any one of supplementary notes 1 to 3, wherein the abnormal event detection means presents a location where the abnormal event is detected in the construction material.

Supplementary Note 5

The working-state cable protection monitoring system according to any one of supplementary notes 1 to 4, wherein the abnormal pattern used by the abnormal event detection means is an abnormal pattern prepared by finding, based on the environment information acquired when the abnormal event occurs, a feature unique to the abnormal event.

Supplementary Note 6

The working-state cable protection monitoring system according to any one of supplementary notes 1 to 5, wherein
the abnormal event detection means
previously stores, as a non-abnormal pattern, environment information acquired when the working means appropriately moves or installs the construction material and
does not detect the abnormal event when the environment information satisfies the non-abnormal pattern.

Supplementary Note 7

The working-state cable protection monitoring system according to supplementary note 6, wherein
the abnormal event detection means determines, based on the environment information and the non-abnormal pattern, a location making contact with the working means among locations of the construction material.

Supplementary Note 8

The working-state cable protection monitoring system according to supplementary note 7, wherein
the abnormal event detection means detects movement of a location where the construction material makes contact with the working means, by being applied to a moving model.

Supplementary Note 9

The working-state cable protection monitoring system according to supplementary note 7 or 8, wherein
the working means applies a vibration having a unique feature with respect to each of the working means to the construction material, and
the abnormal event detection means determines each location of the working means, based on the environment information and the unique feature of a vibration in a location making contact with the working means among locations of the construction material.

Supplementary Note 10

The working-state cable protection monitoring system according to any one of supplementary notes 7 to 9, further including a work management server that previously stores disposition information of the working means, wherein
the abnormal event detection means determines a location making contact with the working means among locations of the construction material, based on the environment information and the non-abnormal pattern, and the disposition information acquired from the work management server.

Supplementary Note 11

The working-state cable protection monitoring system according to any one of supplementary notes 1 to 10, further including
a monitoring sensor that monitors a state of the working means wherein
the abnormal event detection means detects the abnormal event, based on the state and the environment information.

Supplementary Note 12

The working-state cable protection monitoring system according to any one of supplementary notes 1 to 11, wherein
the construction material includes a repeater device including an optical amplifier having an optical amplification repeater function, and
the optical fiber included in the construction material
is not connected to the optical amplifier and
is connectable to the interrogator by being drawn to outside at a connection unit to the repeater device.

Supplementary Note 13

The working-state cable protection monitoring system according to supplementary note 12, wherein
the optical fiber included in the construction material
is drawn to outside at a connection unit to the repeater device via an optical coupler connected in such a way as to monitor a work section including a location where the working means and the construction material make contact with each other.

Supplementary Note 14

The working-state cable protection monitoring system according to supplementary note 12 or 13, further including a power supply means that supplies power from outside to the construction material, wherein
at least one of a plurality of optical amplification repeaters in the repeater device is connected to the optical fiber sensing the environment information and includes a function of performing optical amplification repeating for light transmitted/received by the interrogator, and
the repeater device further includes a power supply circuit capable of switching a range to be supplied with power according to a magnitude or a difference of a direction of current supplied from the power supply means and
restrains, during a protection monitoring period of the working-state cable, power supply to a circuit range being not involved in optical amplification repeating of light transmitted/received by the interrogator, according to supply current to the power supply circuit or a difference of a direction.

Supplementary Note 15

A working-state cable protection monitoring method including:
acquiring, by an optical fiber having at least one core being included in a wire cable-shaped construction material being moved or installed, environment information in each location of the construction material;
detecting, when the environment information acquired in the location satisfies an abnormal pattern, an abnormal event in the location; and
stopping, when the abnormal event is detected, movement and installation of the wire cable-shaped construction material.

Supplementary Note 16

A storage medium storing a working-state cable protection monitoring program causing an information processing device to execute:
processing of acquiring, by an optical fiber having at least one core being included in a wire cable-shaped construction material being moved or installed, environment information in each location of the construction material;
processing of detecting, when the environment information acquired in the location satisfies an abnormal pattern, an abnormal event in the location; and
processing of stopping, when the abnormal event is detected, movement and installation of the wire cable-shaped construction material.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-104718, filed on Jun. 17, 2020, the disclosure of which is incorporated herein in its entirety by reference.

REFERENCE SIGNS LIST 1, 4 Cable protection monitoring system
10 Submarine cable
11, 200 Optical fiber
15 Submarine cable laying ship (CS)
16 Plough burying machine
17 Cable engine
18 Sheave
20 DAS interrogator
21 Sensing function unit
22 Data primary processing unit
30 Monitoring server
31 Process management control system
40, 41, 42 Repeater (REP)
43 Repeater body
44 Tail cable
45 Joint chamber
47 Bellows unit
48, 49 Cable coupling unit
50, 51, 52, 53 Monitor cord
60 Optical coupler
100 Interrogator
300 Abnormal event detection means 500 Construction material
600 Working means

What is claimed is:

1. A working-state cable protection monitoring system comprising:
   a work apparatus configured to work or install a wire cable-shaped construction material including an optical fiber having at least one core;
   an interrogator configured to acquire environment information in each location of the construction material being sensed by the optical fiber; and
   an abnormal event detector configured to detect, when the environment information acquired in the location satisfies an abnormal pattern, an abnormal event in the location, wherein
   the work apparatus stops movement and installation of the wire cable-shaped construction material when the abnormal event is detected, and
   the abnormal event detector:
      previously stores, as a non-abnormal pattern, previous environment information acquired when the work apparatus appropriately moves or installs the construction material,
      does not detect the abnormal event when the environment information satisfies the non-abnormal pattern, and
      determines, based on the environment information and the non-abnormal pattern, a location making contact with the work apparatus among locations of the construction material.

2. The working-state cable protection monitoring system according to claim 1, wherein the abnormal event detector corrects, based on a production record or an installation record of the construction material or by acquiring a degree of sensing with respect to each location of the construction material, a sensing sensitivity for the environment information with respect to each location of the construction material, and then detects the abnormal pattern.

3. The working-state cable protection monitoring system according to claim 1, wherein the abnormal event detector divides the acquired environment information into frequency bands and then detects the abnormal pattern.

4. The working-state cable protection monitoring system according to claim 1, wherein the abnormal event detector presents a location where the abnormal event is detected in the construction material.

5. The working-state cable protection monitoring system according to claim 1, wherein the abnormal pattern used by the abnormal event detector is prepared by finding, based on the environment information acquired when a previous abnormal event occurs, a feature unique to the previous abnormal event.

6. The working-state cable protection monitoring system according to claim 1, wherein
   the abnormal event detector detects movement of a location where the construction material makes contact with the work apparatus, by being applied to a moving model.

7. The working-state cable protection monitoring system according to claim 1, wherein
   the work apparatus applies a vibration having a unique feature with respect to each of the work apparatus to the construction material, and
   the abnormal event detector determines each location of the work apparatus, based on the environment information and the unique feature of a vibration in a location making contact with the work apparatus among locations of the construction material.

8. The working-state cable protection monitoring system according to claim 1, further comprising
   a work management server configured to previously store disposition information of the work apparatus, wherein
   the abnormal event detector determines a location making contact with the work apparatus among locations of the construction material, based on the environment information and the non-abnormal pattern, and the disposition information acquired from the work management server.

9. The working-state cable protection monitoring system according to claim 1, further comprising
   a monitoring sensor configured to monitor a state of the work apparatus, wherein
   the abnormal event detector detects the abnormal event, based on the state and the environment information.

10. A working-state cable protection monitoring system comprising:
    a work apparatus configured to work or install a wire cable-shaped construction material including an optical fiber having at least one core;
    an interrogator configured to acquire environment information in each location of the construction material being sensed by the optical fiber;
    an abnormal event detector configured to detect, when the environment information acquired in the location satisfies an abnormal pattern, an abnormal event in the location; and
    a power supplier configured to supply power from outside to the construction material, wherein
    the work apparatus stops movement and installation of the wire cable-shaped construction material when the abnormal event is detected,
    the construction material includes a repeater including an optical amplifier having an optical amplification repeater function, and
    the optical fiber included in the construction material
       is not connected to the optical amplifier and
       is connectable to the interrogator by being drawn to outside at a connector to the repeater.

11. The working-state cable protection monitoring system according to claim 10, wherein
    the optical fiber included in the construction material
       is drawn to outside at a connector to the repeater via an optical coupler connected in such a way as to monitor a work section including a location where the work apparatus and the construction material make contact with each other.

12. A working-state cable protection monitoring method comprising:
    acquiring, by an optical fiber having at least one core being included in a wire cable-shaped construction material being moved or installed, environment information in each location of the construction material;
    previously storing, as a non-abnormal pattern, previous environment information acquired when a work apparatus appropriately moves or installs the construction material,
    detecting, when the environment information acquired in the location satisfies an abnormal pattern, an abnormal event in the location, wherein the abnormal event is not detected when the environment information satisfies the non-abnormal pattern;

stopping, when the abnormal event is detected, movement and installation of the wire cable-shaped construction material; and determining, based on the environment information and the non-abnormal pattern, a location making contact with the work apparatus among locations of the construction material.

* * * * *